US010625437B2

(12) United States Patent
Harris

(10) Patent No.: US 10,625,437 B2
(45) Date of Patent: Apr. 21, 2020

(54) ATTACHABLE AND EXTENDABLE SAW AND METHODS FOR USING SAME

(71) Applicant: Willard D. Harris, Houston, TX (US)

(72) Inventor: Willard D. Harris, Houston, TX (US)

(73) Assignee: Mechanical & Electrical Concepts, Inc., Houston, TX (US)

( * ) Notice: Subject to any disclaimer, the term of this patent is extended or adjusted under 35 U.S.C. 154(b) by 0 days.

(21) Appl. No.: 16/269,734

(22) Filed: Feb. 7, 2019

(65) Prior Publication Data
US 2019/0224764 A1 Jul. 25, 2019

Related U.S. Application Data

(63) Continuation-in-part of application No. 15/301,867, filed as application No. PCT/US2015/024986 on Apr. 8, 2015.
(Continued)

(51) Int. Cl.
B27B 5/08 (2006.01)
B23D 45/00 (2006.01)
(Continued)

(52) U.S. Cl.
CPC .............. B27B 5/08 (2013.01); B23D 45/006 (2013.01); B23D 45/021 (2013.01); B23D 47/10 (2013.01)

(58) Field of Classification Search
CPC .............. Y10T 83/9459; B26D 7/2614; B26D 7/2621; B26D 7/2635; B23D 59/007;
(Continued)

(56) References Cited

U.S. PATENT DOCUMENTS 1,975,191 A 10/1934 Calef
2,384,243 A 9/1945 Flohr
(Continued)

FOREIGN PATENT DOCUMENTS

JP 08168920 A * 7/1996 ............. B23D 53/02
KR 20120086070 A * 8/2012 ............. B23D 45/16
(Continued)

OTHER PUBLICATIONS

JP-08168920 English Translation; Jul. 1996 JP Miura, Yuichi ; B23D53/02.*

Primary Examiner — Laura M Lee
(74) Attorney, Agent, or Firm — Christopher A. Taravella

(57) ABSTRACT

An attachable and extendable saw and methods for cutting an object on a work surface with the attachable and extendable saw are provided. The extendable saw can include a saw blade housing coupled to a main body by at least one extendable member, the saw blade housing at least partially covers a saw blade and the extendable member can be configured to move the saw blade housing and the saw blade between a retracted position and an extended position relative to the main body. The extendable saw can also include a motorized unit coupled to the saw blade and configured to rotate or provide other blade movement to the saw blade and a switchable device or unit disposed on the main body and having at least one contact surface that facilitates attachment of the extendable saw to the work surface, said contact surface being switchable between a magnetized or vacuum state and a non-magnetized state or non-vacuum state, respectively. Attachment of the saw blade to the attachable and extendable saw is provided for.

10 Claims, 21 Drawing Sheets

Related U.S. Application Data

(60) Provisional application No. 61/977,447, filed on Apr. 9, 2014.

(51) Int. Cl.
   *B23D 47/10* (2006.01)
   *B23D 45/02* (2006.01)

(58) Field of Classification Search
   CPC .... B23D 47/02; B23D 53/003; B23D 45/006; B27B 5/08; A01G 23/091
   USPC .... 83/698.21, 928, 745, 629, 487, 544, 397, 83/478, 860; 30/372, 377; 451/154; 144/278.3
   See application file for complete search history.

(56) References Cited

U.S. PATENT DOCUMENTS

| | | | |
|---|---|---|---|
| 2,512,970 | A | 6/1950 | Rogne |
| 2,645,011 | A | 7/1953 | Otis |
| 3,673,744 | A | 7/1972 | Oimoen |
| 3,722,497 | A | 3/1973 | Hiestand |
| 4,554,957 | A | 11/1985 | Zayat |
| 4,570,609 | A | 2/1986 | Hogue |
| 4,572,303 | A | 2/1986 | Marechal |
| 4,718,201 | A | 1/1988 | Legge |
| 4,870,946 | A | 3/1989 | Long |
| 4,926,916 | A | 5/1990 | Legler |
| 5,012,582 | A | 5/1991 | Bristol |
| 5,013,092 | A | 5/1991 | Kulhawy |
| 5,038,473 | A | 8/1991 | Bradley |
| 5,142,825 | A | 9/1992 | Floyd |
| 5,199,221 | A | 4/1993 | Hillestad |
| 5,545,079 | A | 8/1996 | Larsson et al. |
| 5,582,538 | A | 12/1996 | Hillestad |
| 5,784,789 | A | 7/1998 | Vargas |
| 5,815,932 | A | 10/1998 | Presher |
| 5,974,674 | A | 11/1999 | Kelly |
| D423,898 | S | 5/2000 | Kelley |
| 6,158,817 | A | 12/2000 | Bertrand |
| 6,161,293 | A | 12/2000 | Watson |
| 6,467,385 | B1 | 10/2002 | Buttrick |
| 6,471,574 | B1 | 10/2002 | Rupprecht |
| 6,678,960 | B2 | 1/2004 | Williams |
| 7,186,170 | B2 | 3/2007 | Harwath-Seyfried |
| 7,739,802 | B2 | 6/2010 | Crain et al. |
| 7,891,101 | B2 | 2/2011 | Brady |
| 8,118,018 | B1 | 2/2012 | Sherment |
| 8,151,680 | B2 * | 4/2012 | Pollard ................ B23D 55/082 83/13 |
| 8,291,563 | B2 | 10/2012 | Harris |
| 8,302,519 | B2 | 11/2012 | McCracken et al. |
| 8,413,645 | B2 | 4/2013 | Donnerdal |
| 8,438,960 | B2 | 5/2013 | Booms |
| 8,671,681 | B1 | 3/2014 | Borner et al. |
| 8,696,245 | B2 | 4/2014 | Clark |
| 8,739,378 | B2 | 6/2014 | Harris |
| 8,839,778 | B2 | 9/2014 | South |
| 9,108,334 | B2 | 8/2015 | Plonsky et al. |
| 10,207,344 | B2 | 2/2019 | Harris |
| 2002/0092393 | A1 | 7/2002 | Mains |
| 2004/0103771 | A1 | 6/2004 | Lin |
| 2005/0097760 | A1 | 5/2005 | McDonnell |
| 2006/0156877 | A1 | 7/2006 | Plonsky |
| 2008/0163492 | A1 | 7/2008 | Johansson |
| 2008/0264225 | A1 | 10/2008 | Crain et al. |
| 2011/0271805 | A1 | 11/2011 | Abadie |
| 2011/0277612 | A1 | 11/2011 | Chen |
| 2013/0098346 | A1 | 4/2013 | Soutch |
| 2014/0133900 | A1 | 5/2014 | Bosch |
| 2014/0260877 | A1 | 9/2014 | Hall |
| 2015/0113814 | A2 | 4/2015 | Cuzdey |
| 2015/0157457 | A1 | 6/2015 | Hacohen |
| 2015/0313097 | A1 | 11/2015 | LaTendresse et al. |
| 2016/0039020 | A1 | 2/2016 | Hilton |
| 2017/0028486 | A1 | 2/2017 | Harris |
| 2017/0232605 | A1 | 8/2017 | Morton |
| 2019/0118277 | A1 | 4/2019 | Harris |

FOREIGN PATENT DOCUMENTS

| | | |
|---|---|---|
| KR | 2016-0116426 A | 3/2015 |
| WO | WO2015157457 | 10/2015 |
| WO | WO2018067189 | 4/2018 |

* cited by examiner

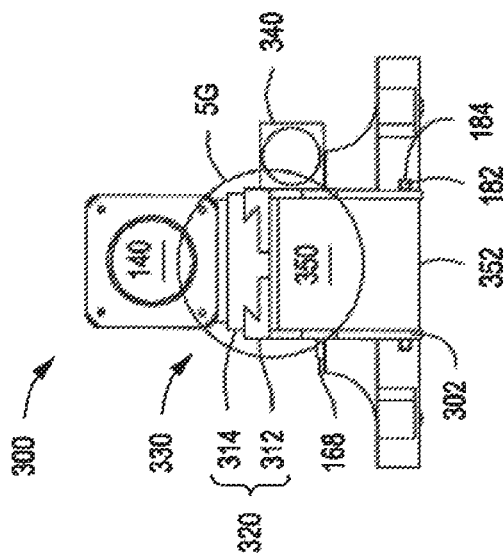
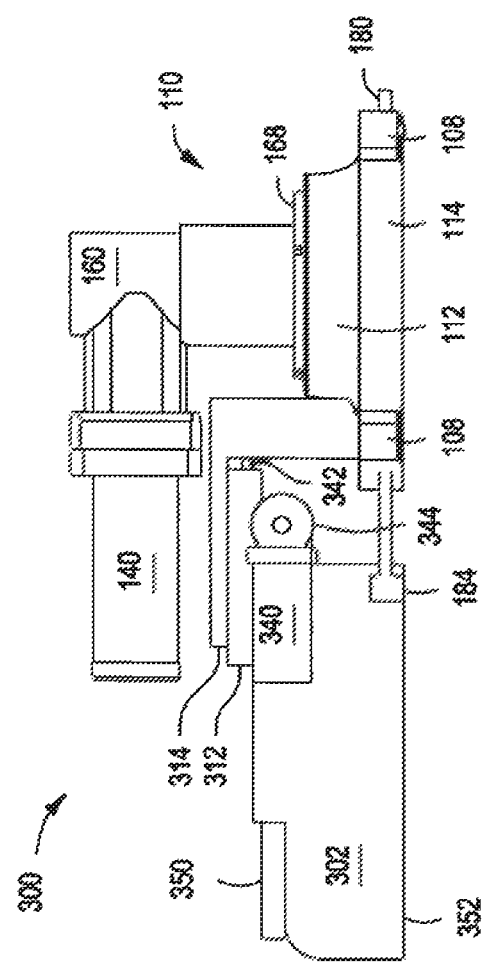
FIG. 5F
FIG. 5E

ATTACHABLE AND EXTENDABLE SAW AND METHODS FOR USING SAME

CROSS-REFERENCE TO RELATED APPLICATIONS

This application is a continuation-in-part of application Ser. No. 15/301,867, which is the National Stage of International Application No. PCT/US2015/024986 filed 8 Apr. 2015, which in turn claims the benefit of U.S. Provisional Application No. 61/977,447, filed on 9 Apr. 2014.

BACKGROUND

Field

Embodiments generally relate to apparatus and methods for metal working. More particularly, such embodiments relate to an attachable and extendable saw and methods for using same.

Description of the Related Art

In the course of metal working or fabrication, metal objects, such as key plates, angle irons, and handrails, are often cut from a metal deck or surface. Such cuts are rarely flush with the metal deck or surface and further processing must be undertaken in order to produce a surface free of the remnants from the metal object. The task of later smoothing out the deck or surface is generally difficult and time consuming or may leave an unsafe environment until the adequate time, tools, and/or skilled worker are available to smooth the surface.

There is a need, therefore, for an attachable and extendable saw and methods for using same.

SUMMARY

A magnetically attachable and extendable saw and methods for using same are provided. In one or more embodiments, the magnetically attachable and extendable saw can include a main body, a blade housing coupled to the main body by at least one extendable member, the blade housing at least partially covers a saw blade and the extendable member can be configured to move the blade housing and the saw blade between a retracted position and an extended position relative to the main body. The extendable saw can also include a motorized unit coupled to the saw blade, and configured to rotate or provide other blade movement to the saw blade and a switchable magnet disposed on the main body that can include at least one contact surface that can be adjustable or switchable between a magnetized state and a non-magnetized state.

In some embodiments, the switchable magnet can be an electromagnet in electrical communication with a switch and configured to control the magnetized state and the non-magnetized state of the contact surface. In some examples, a control system can be operatively coupled to at least the motorized unit and the switchable magnet. The control system can be configured to activate the magnetized state of the contact surface prior to activating the rotation or other blade movement of the saw blade via the motorized unit. The control system can also be configured to deactivate the rotation or other blade movement of the saw blade prior to deactivating the magnetized state (or activating the demagnetized state).

In other embodiments, the switchable magnet can include a magnet housing, permanent magnets disposed within the magnet housing and configured to provide the magnetized state and the non-magnetized state of the contact surface, and a switch or a lever extending from the magnet housing and configured to cause relative rotation of the permanent magnets for controlling the magnetized state and the non-magnetized state of the contact surface.

In one or more embodiments, a method for removing an object protruding from a work surface with an extendable saw can include positioning the extendable saw on or adjacent to the work surface, the extendable saw can include: a blade housing coupled to a main body by at least one extendable member, where the blade housing at least partially covers a saw blade and the extendable member can be configured to move the blade housing and the saw blade between a retracted position and an extended position relative to the main body, a motorized unit coupled to the saw blade and configured to rotate or provide other blade movement to the saw blade, and a switchable magnet disposed on the main body and having at least one contact surface that can be adjustable or switchable between a magnetized state and a non-magnetized state. The method can further include attaching the extendable saw to the work surface by activating the switchable magnet to provide the magnetized state of the contact surface. The method can further include rotating or providing other blade movement to the saw blade via the motorized unit and extending or otherwise moving the blade housing and the saw blade from the retracted position toward the object protruding from the work surface, where the object can be disposed to, from, and/or between the retracted and extended positions. The method can further include cutting through the object with the saw blade to separate the object from the work surface.

In some embodiments, the method can also include maintaining a blade guard in a stationary position as the blade housing and the saw blade extend from the retracted position so that the saw blade can be at least partially revealed within a cutting window of the blade housing as the saw blade moves away from the blade guard and the main body. In other embodiments, the method can also include retracting or otherwise moving the blade housing and the saw blade to the retracted position subsequent to cutting through the object. In some embodiments, the method can also include maintaining a blade guard in a stationary position as the blade housing and the saw blade move towards the retracted position so that the saw blade can be at least partially concealed by the blade guard within the cutting window as the saw blade moves towards the blade guard and the main body.

In one or more embodiments, the magnetically attachable and extendable saw can include a blade housing coupled to a main body by an extendable member, where the blade housing at least partially covers a saw blade and the extendable member can be configured to move the blade housing and the saw blade between a retracted position and an extended position relative to the main body. A motorized unit can be coupled to the saw blade and can be configured to drive the saw blade. A switchable magnet can be disposed on the main body and can include at least one contact surface that can be switchable between a magnetized state and a non-magnetized state. A control system can be operatively coupled to the extendable member, the motorized unit, and the switchable magnet.

In other embodiments, the magnetically attachable and extendable saw can include an extendable member coupled to and between a main body and a blade housing. The extendable member can be configured to move the blade housing and a saw blade between a retracted position and an extended position relative to the main body. The extendable member can include a first segment coupled to the main body and a second segment coupled to the blade housing. The extendable saw can also include an actuator unit configured to drive the extendable member for moving the blade housing and the saw blade between the retracted position and the extended position. The actuator unit can also include a pinion gear coupled to the first segment of the extendable member, a rack gear coupled to the second segment of the extendable member, and an actuator motor operatively coupled to the rack gear and the pinion gear and configured to drive the extendable member. The extendable member can also include a motorized unit coupled to the saw blade and configured to drive the saw blade and a switchable magnet disposed on the main body and having at least one contact surface that can be switchable between a magnetized state and a non-magnetized state.

In some embodiments, the magnetically attachable and extendable saw can include a blade housing coupled to a main body by an extendable member, where the blade housing at least partially covers a circular saw blade and the extendable member can be configured to move the blade housing and the circular saw blade between a retracted position and an extended position relative to the main body. The extendable saw can include a motorized unit coupled to the circular saw blade and configured to drive the circular saw blade and a switchable magnet disposed on the main body and having at least one contact surface that can be switchable between a magnetized state and a non-magnetized state. The extendable saw can also include a control system operatively coupled to the extendable member, the motorized unit, and the switchable magnet, where the control system can be configured to maintain the extendable member in the retracted position and maintain the motorized unit from driving the circular saw blade if the at least one contact surface of the switchable magnet can be in the non-magnetized state.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for the invention may admit to other equally effective embodiments.

FIGS. 5A-5G depict perspective views of another illustrative magnetically attachable and extendable saw, according to one or more embodiments described.

DETAILED DESCRIPTION

Figure 1A:
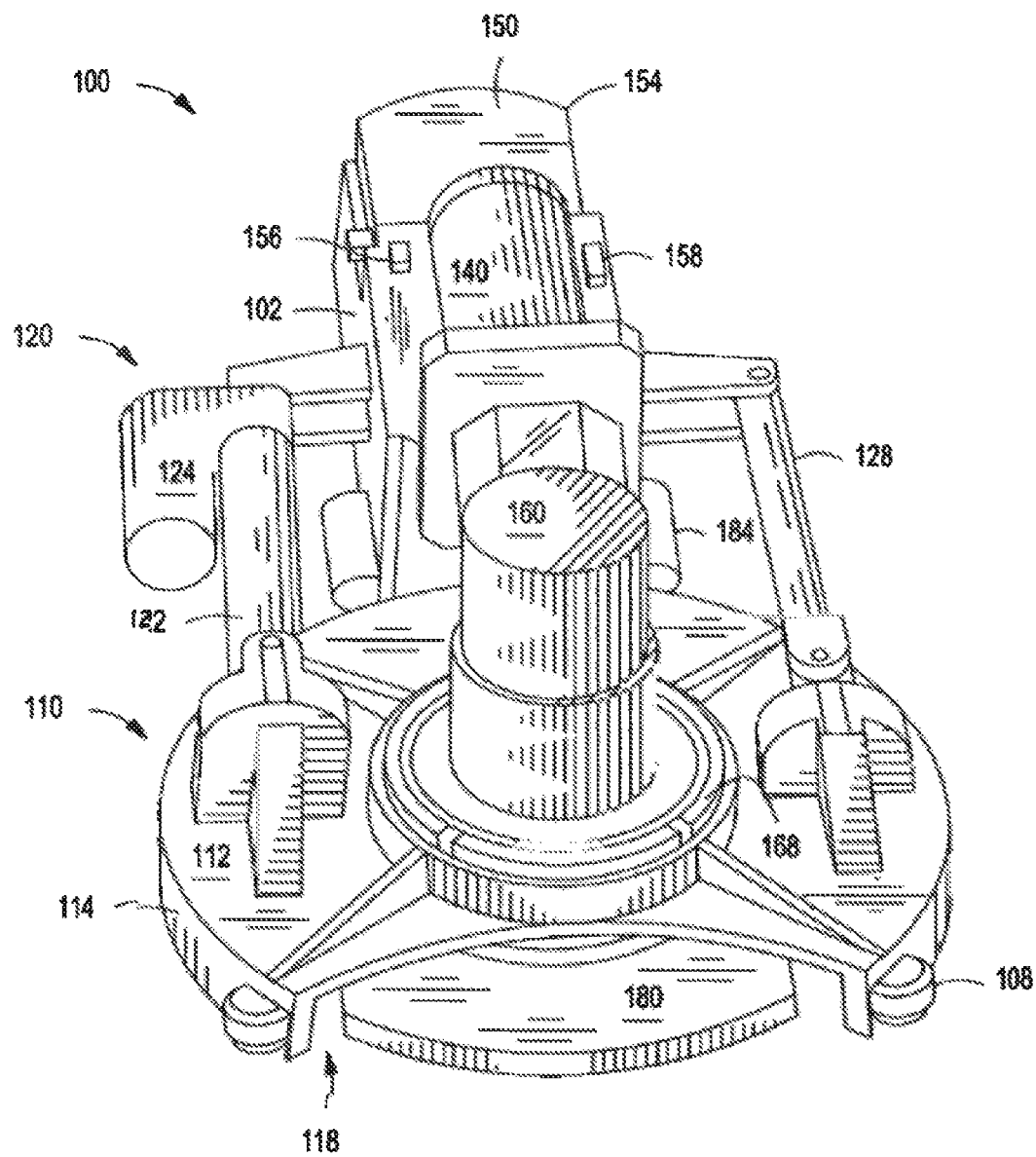
FIGS. 1A-1C depict perspective views of an illustrative magnetically attachable and extendable saw, according to one or more embodiments described.
Figure 1B:
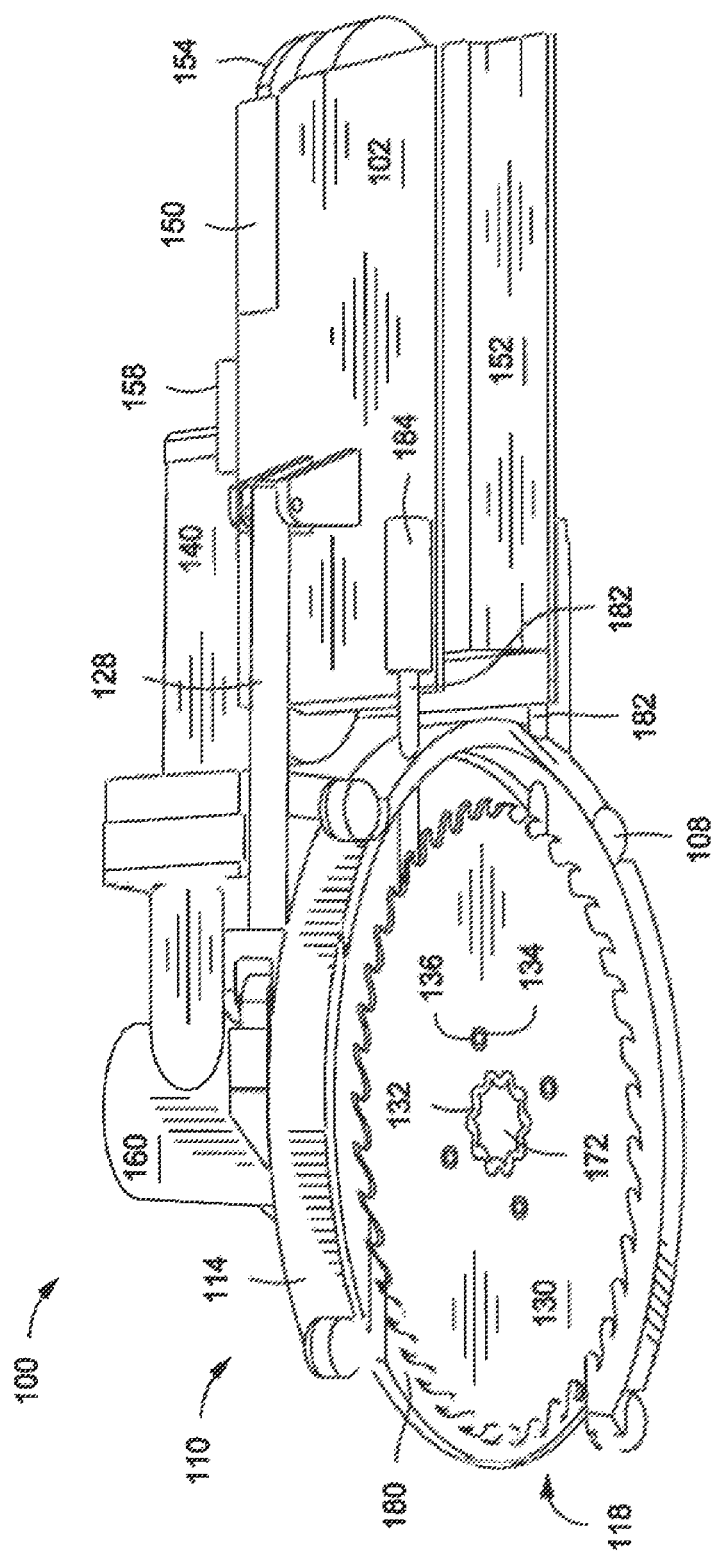
Figure 1C:
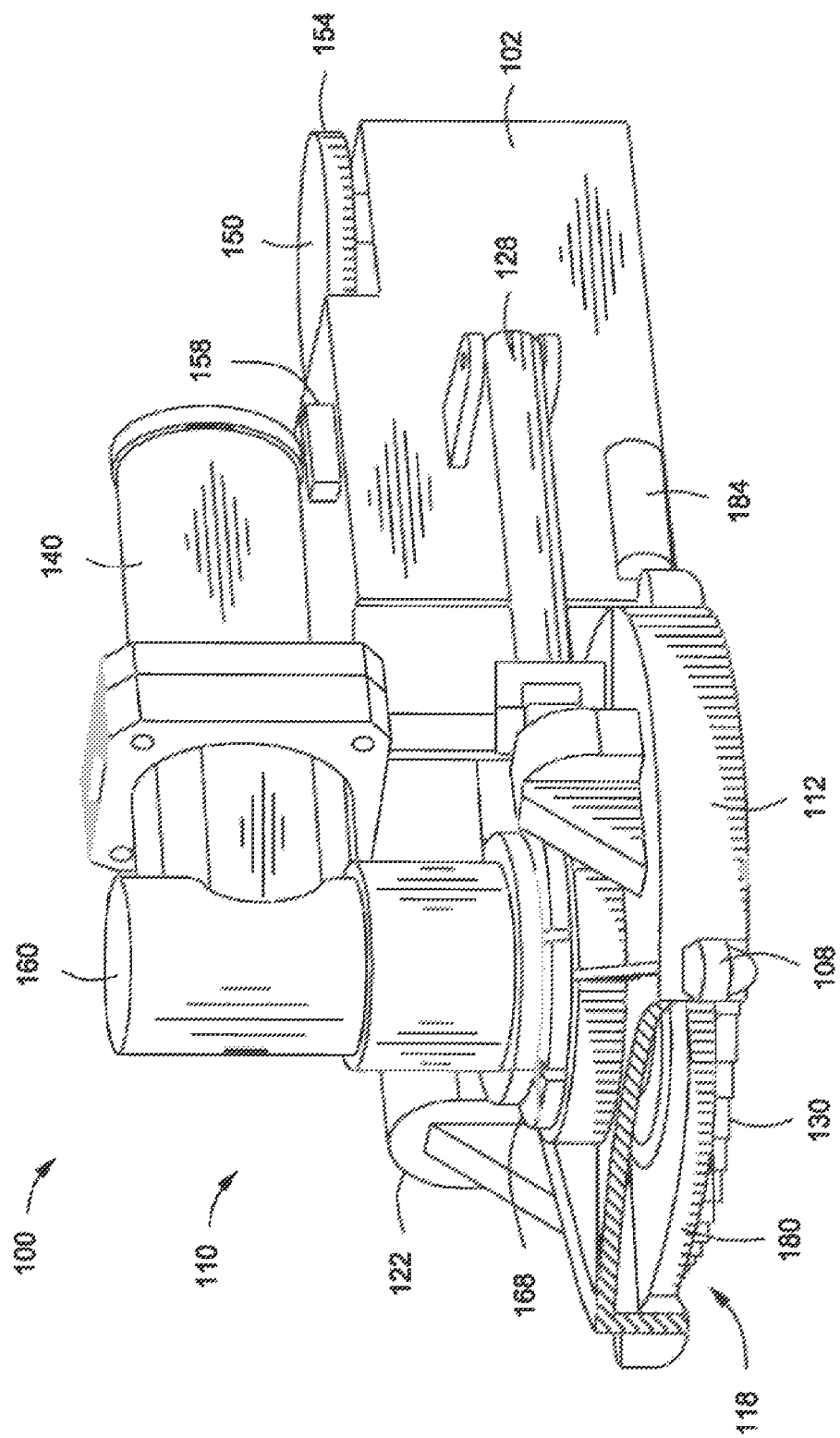

FIGS. 1A-1C depict perspective views of an illustrative magnetically attachable and extendable saw 100, according to one or more embodiments. The extendable saw 100 can include a main body 102 and a blade housing 110 which can be coupled together by at least one extendable member 120. The blade housing 110 can at least partially cover a saw blade 130 and the extendable member 120 can be configured to move the blade housing 110 and the saw blade 130 to, from, and/or between a retracted position and an extended position relative to the main body 102. A motorized unit 140 can be coupled to the saw blade 130 and configured to rotate, drive, or otherwise provide blade movement to the saw blade 130.

The main body 102 can include at least one switchable magnet 150 having at least one contact surface 152 that can be adjustable or switchable between a magnetized state and a non-magnetized state. In some embodiments, the switchable magnet 150 can be an electromagnet configured to provide the magnetized state and the non-magnetized state from a power source (not shown). For example, the switchable magnet 150 can be an electromagnet in electrical communication with the power source via an electrical control switch, such as a switch 156. The switch 156 can be configured to control the magnetized state and the non-magnetized state of the contact surface 152 by providing an electrical contact in the circuit or by breaking the electrical contact in the circuit. In other embodiments, the switchable magnet 150 can include one or more permanent magnets configured to provide the magnetized state and the non-magnetized state of the contact surface 152. Depending on the type of magnets utilized in the switchable magnet 150, a magnet housing 154 can include various magnets (e.g., electromagnet and/or permanent magnets) and/or be a structural portion of the switchable magnet 150. For example, the switchable magnet 150 can include one or more electromagnets at least partially within the magnet housing 154 and the contact surface 152 of the electromagnet can be a lower surface of the magnet housing 154. In another example, the magnet housing 154 can be the outer surface of or other portion of one or more electromagnets that can form the switchable magnet 150 and the outer surface of the magnet housing 154 can be the contact surface 152.

In some embodiments, a control system 158 and/or the switch 156 can be operatively coupled to at least the motorized unit 140, the switchable magnet 150, and/or the extendable member 120. In one example, the control system 158 can be configured to activate the magnetized state of the contact surface 152 prior to activating the rotation or other movement of the saw blade 130 via the motorized unit 140 and/or extending or otherwise moving the blade housing 110 and the saw blade 130 via the extendable member 120 to the extended position. In other embodiments, the control system 158 can be configured to cease the rotation or other blade movement of the saw blade 130 via the motorized unit 140 and/or retract or otherwise move the blade housing 110 and the saw blade 130 via the extendable member 120 to the retracted position prior to deactivating the magnetized state (or activating the non-magnetized state) of the contact surface 152. In other embodiments, the control system 158 can be configured to cease the rotation or other blade movement of the saw blade 130 via the motorized unit 140 if the magnetized state of the contact surface 152 changes to the non-magnetized state.

The control system 158 can include one or more microprocessors, one or more controllers, one or more switches, software, and/or other equipment that can control one or more of the various aspects and systems of the extendable saw 100, including, but not limited to, the activation and subsequent control of the magnetized state and the non-magnetized state of the contact surface 152, the powering and the rotational speed or other blade movement speed of the saw blade 130, and/or the movement of the blade housing 110 and the saw blade 130. In one example, a single engagement of the switch 156 can activate the control system 158 to activate and maintain the magnetized state of the contact surface 152, power-up and rotate the saw blade 130, and extend the blade housing 110 and the saw blade 130 to the desired object to be cut. In another example, a single engagement of the switch 156 can activate the control system 158 to retract the blade housing 110 and the saw blade 130 to the retracted position, power-down the saw blade 130, and finally deactivate the magnetized state (or active the non-magnetized state) of the contact surface 152.

In other embodiments, the extendable member 120 can be configured to move the blade housing 110 and the saw blade 130 in a linear direction or a non-linear (e.g., curved or angular) direction to, from, and/or between the retracted and extended positions. In one embodiment, the extendable member 120 can include an actuator unit 122 coupled to and configured to be driven by a motor 124. As depicted in FIGS. 1A-1C, the actuator unit 122 can include a linear actuator and the motor 124 can include an electric motor. However, other types of actuators, actuating devices, motors, and/or devices can be used within the extendable member 120. The motor 124 can include an electric motor (e.g., direct current or alternating current), a hydraulic motor, a pneumatic motor (e.g., gas or air), and/or other similar device.

In another embodiment, a hinge impingement 128 can be coupled to the main body 102 and the blade housing 110. The hinge impingement 128 can be utilized to assist moving or pivoting the blade housing 110 and the saw blade 130 in non-linear or curved directions. For example, the hinge impingement 128 and the actuator unit 122 (e.g., a linear actuator) can be configured to pivot the blade housing 110 and the saw blade 130 forward and in a non-linear direction (e.g., a curved direction or an angular direction) to, from, and/or between the retracted and extended positions. Also, the hinge impingement 128 can be utilized to stabilize or support the blade housing 110 against rotational kick-back while in a cutting operation.

In another embodiment, the blade housing 110 can include one or more upper faces or upper portions 112 and one or more side walls or side portions 114. The upper portion can be disposed about or above the saw blade 130 and the side portion 114 can be at least partially circumferentially disposed around the saw blade 130 and can be extending downwardly from the upper portion 112. An opening or a cutting window 118 can be disposed within or otherwise defined by the upper portion 112 and the side portion 114 of the blade housing 110. The cutting window 118 can provide the saw blade 130 exposure or access to objects that are to be cut by the extendable saw 100 during the cutting operations. The blade housing 110 can be made from or contain one or more non-magnetic materials, such as, for example, aluminum, an aluminum alloy, magnesium, non-magnetic stainless steel, or alloys thereof.

In another embodiment, the extendable saw 100 can include a blade guard 180 coupled to the main body 102 and disposed between the saw blade 130 and the upper portion 112 of the blade housing 110. The blade guard 180 can include at least one support member 182, but generally, can include two or more support members 182 coupled to the main body 102. As depicted in FIG. 1B, each of the support members 182 can pass through the blade housing 110, such as the side portion 114, and attach to a mount 184 disposed on the main body 102. Therefore, the blade guard 180 can be stationary relative to the main body 102 when the blade housing 110 and the saw blade 130 are moved between the retracted and extended positions.

Figure 2A:
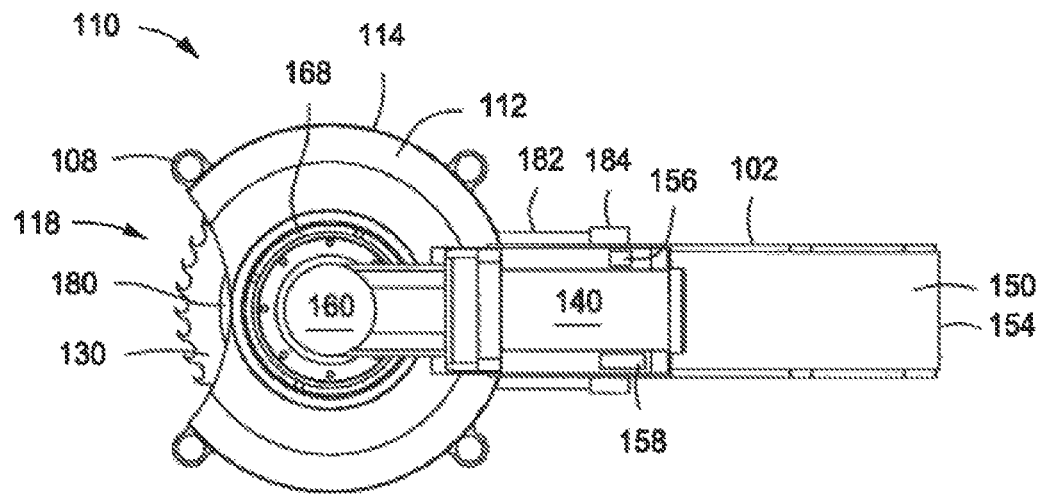
FIGS. 2A-2B depict other perspective views of portions of the illustrative magnetically attachable and extendable saw depicted in FIGS. 1A-1C, according to one or more embodiments described.
Figure 2B:
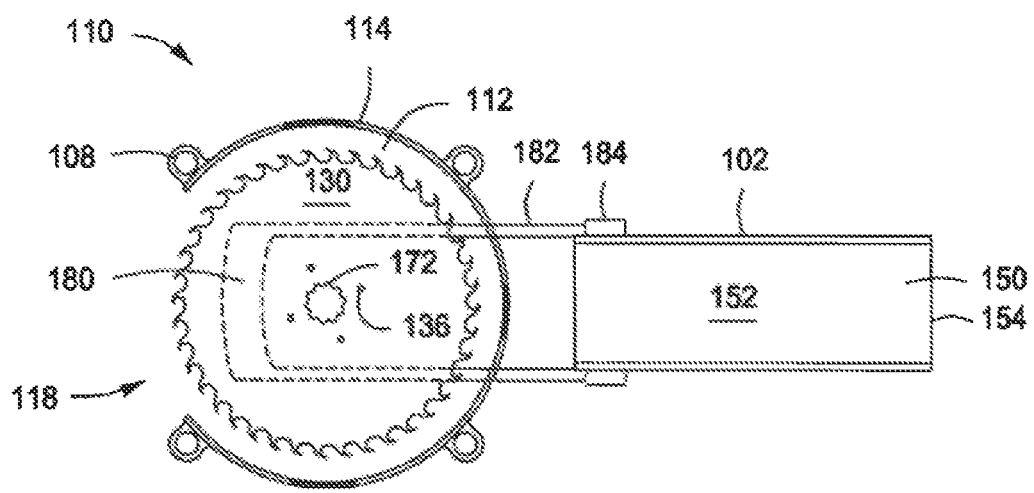

FIGS. 1A-1C depict the blade housing 110 and the saw blade 130 in the retracted position, while FIGS. 2A-2B depict the blade housing 110 and the saw blade 130 in the extended position. The main body 102, the blade housing 110, the saw blade 130, and the blade guard 180 are depicted by an above perspective view illustrated in FIG. 2A and a below perspective view illustrated in FIG. 2B. The blade guard 180 can be configured to at least partially, substantially, or completely conceal or cover the saw blade 130 within the cutting window 118 of the blade housing 110, such as when the blade housing 110 and the saw blade 130 are at the retracted position, as depicted in FIGS. 1A-1C. Also, the blade guard 180 can be configured to at least partially, substantially, or completely reveal or expose the saw blade 130 within the cutting window 118 once the blade housing 110 and the saw blade 130 are at or near the extended position, as depicted in FIGS. 2A-2B.

The extendable member 120 can be configured to move the saw blade 130 by a predetermined maximum cut distance, also known as a stroke. The stroke can be the distance measured from the retracted position to the extended position. In some examples, the stroke of the extendable saw 100 can be about 0.5 inches, about 1 inch, about 1.25 inches, about 1.5 inches, about 1.75 inches, about 2 inches, about 2.25 inches, about 2.5 inches, about 2.75 inches, about 3 inches, about 3.25 inches, about 3.5 inches, about 3.75 inches, about 4 inches, about 4.25 inches, about 4.5 inches, about 4.75 inches, about 5 inches, about 5.25 inches, about 5.5 inches, about 5.75 inches, about 6 inches, about 6.25 inches, about 6.5 inches, about 6.75 inches, about 7 inches, about 7.25 inches, about 7.5 inches, about 7.75 inches, about 8 inches, about 8.25 inches, about 8.5 inches, about 8.75 inches, about 9 inches, about 9.25 inches, about 9.5 inches, about 9.75 inches, about 10 inches, or greater. In other examples, the stroke of the extendable saw 100 can be of about 1 inch to about 6 inches, about 1 inch to about 5 inches, about 1 inch to about 4 inches, about 1 inch to about 3 inches, about 1 inch to about 2 inches, about 1.5 inches to about 5 inches, about 2 inches to about 4 inches, or about 2.5 inches to about 3 inches.

In another embodiment, the extendable saw 100 can include the motorized unit 140 coupled to or disposed on the blade housing 110. The motorized unit 140 can include an electric motor (e.g., direct current or alternating current), a hydraulic motor, a pneumatic motor (e.g., gas or air), and/or other similar device.

In some examples, the saw blade 130 can be configured to have a rotational speed or other blade movement speed of about 10 rpm, about 50 rpm, about 75 rpm, about 100 rpm, about 125 rpm, about 150 rpm, about 175 rpm, about 200 rpm, about 225 rpm, about 250 rpm, about 275 rpm, about 300 rpm, about 325 rpm, about 350 rpm, about 375 rpm, about 400 rpm, about 425 rpm, about 450 rpm, about 475 rpm, about 500 rpm, about 525 rpm, about 550 rpm, about 575 rpm, about 600 rpm. In other examples, the saw blade 130 can be configured to have a rotational speed or other blade movement speed of about 100 rpm to about 500 rpm, about 150 rpm to about 400 rpm, or about 200 rpm to about 300 rpm.

In one or more embodiments, the motorized unit 140 can have a rotational speed of about 20 rpm to about 5,000 rpm, about 50 rpm to about 5,000 rpm, about 100 rpm to about 5,000 rpm, about 150 rpm to about 400 rpm, or about 200 rpm to about 300 rpm or about 1,000 rpm to about 4,000 rpm, or about 2,000 rpm to about 3,000 rpm. In some embodiments, the motorized unit 140 can have a lower rotational speed, such as, for example, of about 20 rpm to about 500 rpm, about 50 rpm to about 400 rpm, about 100 rpm to about 350 rpm, or about 200 rpm to about 300 rpm. In other embodiments, in order to have sufficient and/or constant torque, the motorized unit 140 can have a higher rotational speed, such as, for example, of about 1,000 rpm to about 5,000 rpm, and can also be coupled to a gear reducer or a gear reduction unit.

In some examples, the motorized unit 140 can be an electric motor, such as a direct current, brush-type motor, and the saw blade 130 can be rotated, driven, or otherwise moved by the electric motor. The motorized unit 140 generally can be directly or indirectly coupled to the saw blade 130 by at least one or more components, such as, for example, shafts, arbors, gears (e.g., gear reducers), transmission, clutch, belts, a base plate, or any combination thereof.

In one or more embodiments, the motorized unit 140 can be directly or indirectly coupled to a gear unit 160 and the saw blade 130 can be directly or indirectly coupled to the gear unit 160. In some exemplary configurations, the gear unit 160 can be directly or indirectly coupled to a base plate 170 and the saw blade 130 can be directly or indirectly coupled to the base plate 170. In other exemplary configurations, the gear unit 160 can be directly or indirectly coupled to a shaft or arbor (not shown) and the saw blade 130 can be directly or indirectly coupled to the shaft or arbor. In other exemplary configurations, the gear unit 160 can be directly or indirectly coupled to the base plate 170 and/or the shaft or arbor and the saw blade 130 can be directly or indirectly coupled to the base plate 170 and/or the shaft or arbor.

The gear unit 160 that can include one or more gears (e.g., a plurality of varying sized gears), shafts and/or arbors, a transmission, a clutch (e.g., spring loaded clutch), belts, bearings, or any combination thereof. For example, the gear unit 160 can be a gear reducer configured to provide a rotational speed or other blade movement speed of the saw blade 130 at a reduced rate relative to the rotational speed of the motorized unit 140 by a predetermined ratio referred to as the motor/blade rotational speed ratio. In some examples, the gear unit 160 can provide a motor/blade rotational speed ratio of about 25:1, about 50:1, about 75:1, about 100:1, about 125:1, about 150:1, about 175:1, about 200:1, about 225:1, about 250:1, about 275:1, about 300:1, about 325:1, about 350:1, about 375:1, about 400:1, about 425:1, about 450:1, about 475:1, or about 500:1, or greater. In other examples, the gear unit 160 can provide a motor/blade rotational speed ratio of about 25:1 to about 400:1, about 50:1 to about 200:1, or about 75:1 to about 150:1, such as, for example, about 100:1. In some examples, the saw blade 130 can be configured to have a rotational speed or other blade movement speed of about 10 rpm, about 50 rpm, about 75 rpm, about 100 rpm, about 125 rpm, about 150 rpm, about 175 rpm, about 200 rpm, about 225 rpm, about 250 rpm, about 275 rpm, about 300 rpm, about 325 rpm, about 350 rpm, about 375 rpm, about 400 rpm, about 425 rpm, about 450 rpm, about 475 rpm, about 500 rpm, about 525 rpm, about 550 rpm, about 575 rpm, about 600 rpm. In other examples, the saw blade 130 can be configured to have a rotational speed or other blade movement speed of about 100 rpm to about 500 rpm, about 150 rpm to about 400 rpm, or about 200 rpm to about 300 rpm.

In some embodiments, the extendable saw 100 can be equipped with an electric motor as the motorized unit 140 and a gear reduction unit as the gear unit 160 that can reduce the rotational speed or other blade movement speed of the saw blade 130 while maintaining constant torque or substantially constant torque to the saw blade 130. In other embodiments, the extendable saw 200 can have a clutch (not shown) for providing slippage to the saw blade 130 while in operation. In one example, the extendable saw 200 can have a clutch (not shown) in the driving mechanism, such as the motorized unit 140, the gear unit 160, or any combination thereof.

Figure 3:
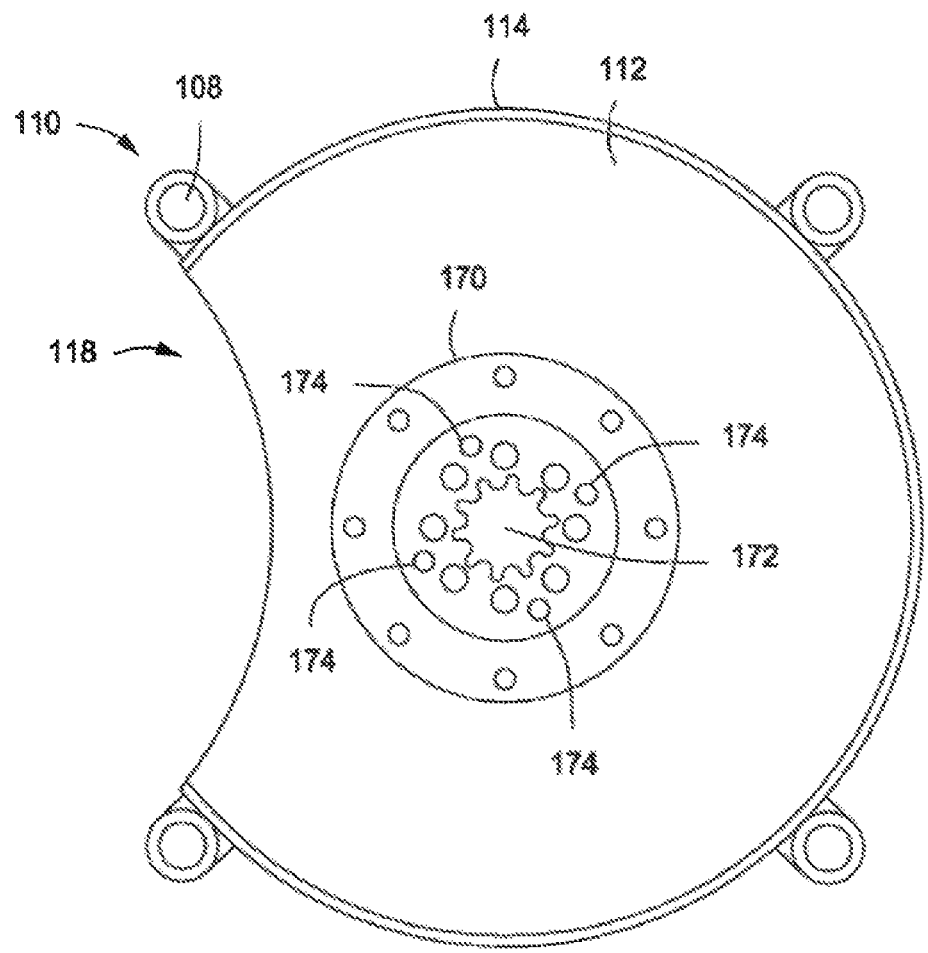
FIG. 3 depicts another perspective view of a portion of the illustrative magnetically attachable and extendable saw depicted in FIGS. 1A-2B, according to one or more embodiments described.

In some embodiments, the saw blade 130 can be coupled to the base plate 170, a shaft or arbor (not shown), or a combination of the base plate 170 and the shaft or arbor by one or more fasteners 136, one or more keepers 172, one or more spindles (not shown), or any combination thereof, as depicted in FIGS. 1B, 2B, and 3. In one embodiment, the fasteners 136 and/or the keepers 172 can be flush with or recessed from (e.g., countersunk) the lower surface or plane of the saw blade 130, as depicted in FIG. 1B. The fasteners 136 and/or keepers 172 that are flush with or recessed from the lower surface or plane of the saw blade 130 can help provide a smooth and/or flush cut across the work surface. In another embodiment, the fasteners 136 and/or the keepers 172 can be flush with or protrude from the lower surface or plane of the saw blade 130.

Exemplary fasteners 136 can include, but not limited to, one or more bolts and screws (e.g., hex-heads), rivets, pins, spindles, or any combination thereof. Exemplary keepers 172 can include, but not limited to, spline sets and other male/female keeper sets for withstanding the torque generated by the saw blade 130, as well as one or more spindles. The one or more keepers 172 can be disposed on the base plate 170 and/or a shaft or arbor (not shown).

FIG. 3 depicts the base plate 170 containing a male portion of a spline set as the keeper 172 and a plurality of threaded holes 174 for receiving the fasteners 136. The saw blade 130, as depicted in FIGS. 1B and 2B, can include an orifice 132 or a female portion of the spline set for receiving the keeper 172 and a plurality of holes 134 in the saw blade 130 for receiving the fasteners 136. For example, the fasteners 136 can be configured to pass through the plurality of holes 134 in the saw blade 130 and thread-in, anchor to, or otherwise attach to the plurality of threaded holes 174 within the base plate 170 and/or a shaft or arbor (not shown). During a cutting process, the torque or load from the saw blade 130 can be placed on the base plate 170 and/or the shaft or arbor. Therefore, the saw blade 130 can be placed on the base plate 170 and/or the shaft or arbor without, or substantially without, slack, play, looseness, or movement.

The saw blade 130 can include one or more orifices 132 or female portions of the spline set for receiving the one or more orifice keepers 172. The keepers 172 and the orifices 132 can have one or more different patterns, shapes, or geometries, such that each male/female keeper set respectively forms a locking set with a matching pattern and the saw blade 130 is secured to, attached to, or otherwise coupled to the base plate 170 and/or a shaft or arbor (not shown). Each of the keepers 172 and the orifices 132 can have one or more different shapes or geometries, such as stars, flowers, ellipses, triangular, rectangular, squares, pentagonal, hexagonal, heptagonal, octagonal, nonagonal, decagonal, or other polygonal shapes.

In some embodiments, the base plate 170 can be directly or indirectly coupled to a shaft or arbor (not shown) which is configured to drive the base plate 170 hence drive the saw blade 130. In other embodiments, the base plate 170 can be one end of the shaft or arbor, such that the keeper 172 can be a protruding portion of the end of the shaft or arbor and/or the plurality of threaded holes 174 can be formed within the end of the shaft or arbor.

In another embodiment, the extendable saw 100 can also include a blade offset ring or a blade height adjuster 168 coupled to the blade housing 110 and the base plate 170. The blade height adjuster 168 can be configured to adjust, such as to increase and/or decrease, a vertical blade height of the saw blade 130. The vertical blade heights can be measured as a minimum height and a maximum height for operating the saw blade 130. The minimum and maximum heights are exemplary heights and should not be construed to be limiting in a particular range or value. For example, the vertical blade height can be measured perpendicular from the work surface as a minimum height, such as when the lower surface of the saw blade 130 skims the work surface, to a maximum height of about 25 mm or less, about 20 mm or less, about 15 mm or less, about 12 mm or less, about 10 mm or less, about 9 mm or less, about 8 mm or less, about 7 mm or less, about 6 mm or less, about 5 mm or less, about 4 mm or less, about 3 mm or less, about 2 mm or less, about 1 mm or less, about 0.9 mm or less, about 0.8 mm or less, about 0.7 mm or less, about 0.6 mm or less, about 0.5 mm or less, about 0.4 mm or less, about 0.3 mm or less, about 0.2 mm or less, about 0.1 mm or less, about 0.09 mm or less, about 0.08 mm or less, about 0.70 mm or less, about 0.06 mm or less, about 0.05 mm or less, about 0.04 mm or less, about 0.03 mm or less, about 0.02 mm or less, about 0.01 mm or less. In one embodiment, the blade height adjuster 168 can include a screw mechanism for adjusting the vertical blade height. For example, the blade height adjuster 168 can include a castle nut or a spinner nut and the respective wrench can be used to increase or decrease the vertical blade height of the saw blade 130 by adjusting the relative position of the base plate 170 to the blade housing 110.

A kerf width or a saw cut width (e.g., the width of the cut) can generally depend on several factors including the width and thickness of a saw blade, the set and number of teeth on the saw blade, and the amount of slack or play available during cutting with the saw blade, as well as other factors. In one or more embodiments, the kerf width of the saw blade 130 can generally be proportional to the thickness of the saw blade 130. In some embodiments, the saw blade 130 can have a kerf width of about 0.01 inches or greater, about 0.02 inches or greater, about 0.03 inches or greater, about 0.04 inches or greater, about 0.05 inches or greater, about 0.06 inches or greater, about 0.07 inches or greater, about 0.08 inches or greater, about 0.09 inches or greater, about 0.1 inches or greater, about 0.2 inches or greater, about 0.3 inches or greater, about 0.4 inches or greater, about 0.5 inches or greater. In some examples, the saw blade 130 can have a thickness of about 0.1 inches and can have a kerf width of about 0.05 inches to about 0.5 inches, about 0.05 inches to about 0.45 inches, about 0.05 inches to about 0.4 inches, about 0.05 inches to about 0.35 inches, about 0.05 inches to about 0.3 inches, about 0.05 inches to about 0.25 inches, about 0.05 inches to about 0.2 inches, about 0.1 inches to about 0.5 inches, about 0.1 inches to about 0.45 inches, about 0.1 inches to about 0.4 inches, about 0.1 inches to about 0.35 inches, about 0.1 inches to about 0.3 inches, about 0.1 inches to about 0.25 inches, about 0.1 inches to about 0.2 inches, about 0.11 inches to less than 0.2 inches, about 0.11 inches to about 0.19 inches, about 0.11 inches to about 0.18 inches, about 0.12 inches to about 0.19 inches, about 0.12 inches to about 0.18 inches, about 0.13 inches to about 0.19 inches, about 0.13 inches to about 0.18 inches, about 0.14 inches to about 0.19 inches, or about 0.14 inches to about 0.18 inches.

A set is generally the degree to which the teeth are bent or otherwise disposed outwardly from the plane of the blade in one or both directions. In one or more embodiments, the saw blade 130 can have a set so that every other tooth of the blade teeth are sequentially angled upward or downward relative to the plane of the saw blade 130. In other embodiments, the saw blade 130 can have a set so that every two teeth of the blade teeth are sequentially angled upward or downward relative to the plane of the saw blade 130. The set can provide the cut thickness of the saw blade 130 wider than the base thickness of the saw blade 130 itself. This additional cut thickness can provide clearance space between the base plate 170 and/or the shaft or arbor and the work surface (e.g., the base material being cut) so that the base plate 170 and/or the shaft or arbor can be kept from dragging or contacting work surface. The additional cut thickness can be provided because of the downwardly angled bent teeth of the saw blade 130 skimming the work surface during operation.

In other embodiments, the blade housing 110 can include at least one roller 108, but generally, can include two rollers 108, three rollers 108, four rollers 108, or more rollers 108 disposed on the blade housing 110. In some embodiments, four rollers 108 are disposed on the blade housing 110, as depicted in FIG. 1B. The rollers 108 can be positioned on the blade housing 110 to extend below the side portion 114. The rollers 108 are configured to roll or otherwise move the blade housing 110 to, from, and/or between the retracted and extended positions. In some examples, the rollers 108 can be round rollers and configured to elevate the blade housing 110 off from a work surface. The blade housing 110 can be elevated off of a work surface by a minimum distance of about 0.1 mm or greater, about 0.2 mm or greater, about 0.3 mm or greater, about 0.4 mm or greater, about 0.5 mm or greater, about 0.6 mm or greater, about 0.7 mm or greater, about 0.8 mm or greater, about 0.9 mm or greater. For example, the blade housing 110 can be elevated off of a work surface by a distance of about 0.2 mm to about 5 mm, about 0.4 mm to about 3 mm, about 0.6 mm to about 2 mm, about 0.8 mm to about 3.5 mm, or about 1 mm to about 3 mm.

In exemplary embodiments, the saw blade 130 can be a circular, cold saw blade or chop saw blade, as depicted in FIGS. 1B and 2A-2B. However, other types and geometries of the saw blade 130 can be utilized in embodiments, including blades from circular saws, cold saws, cut-off saws, chop saws, rip saws, hacksaws, hot saws, friction saws, band saws, scroll saws, jig saws, as well as other saws. In some embodiments, the saw blade 130 can include or be coated with tungsten, tungsten carbide, hardened steel, hardened tool steel, high speed steel, alloys thereof, or combinations thereof. In some examples, the saw blade 130 can be a hardened-tool steel circular saw blade, a high speed steel circular saw blade, or a tungsten carbide-tipped, circular saw blade.

In some examples, the saw blade 130 can have a thickness of about 0.5 mm or greater, about 1 mm or greater, about 2 mm or greater, about 3 mm or greater, about 4 mm or greater, about 5 mm or greater, about 6 mm or greater, about 7 mm or greater, or about 8 mm or greater. In other examples, the saw blade 130 can have a thickness of about 0.5 mm or greater, about 0.6 mm or greater, about 0.7 mm or greater, about 0.8 mm or greater, about 0.9 mm or greater, about 1 mm or greater, about 1.1 mm or greater, about 1.2 mm or greater, about 1.3 mm or greater, about 1.4 mm or greater, about 1.5 mm or greater, about 1.6 mm or greater, about 1.7 mm or greater, about 1.8 mm or greater, about 1.9 mm or greater, about 2 mm or greater, about 2.1 mm or greater, about 2.2 mm or greater, about 2.3 mm or greater, about 2.4 mm or greater, about 2.5 mm or greater, about 2.6 mm or greater, about 2.7 mm or greater, about 2.8 mm or greater, about 2.9 mm or greater, about 3 mm or greater, about 3.1 mm or greater, about 3.2 mm or greater, about 3.3 mm or greater, about 3.4 mm or greater, about 3.5 mm or greater, about 3.6 mm or greater, about 3.7 mm or greater, about 3.8 mm or greater, about 3.9 mm or greater, about 4 mm or greater, about 4.1 mm or greater, about 4.2 mm or greater, about 4.3 mm or greater, about 4.4 mm or greater, about 4.5 mm or greater, about 4.6 mm or greater, about 4.7 mm or greater, about 4.8 mm or greater, about 4.9 mm or greater, about 5 mm or greater, about 5.1 mm or greater, about 5.2 mm or greater, about 5.3 mm or greater, about 5.4 mm or greater, about 5.5 mm or greater, about 5.6 mm or greater, about 5.7 mm or greater, about 5.8 mm or greater, about 5.9 mm or greater, about 6 mm or greater, about 6.1 mm or greater, about 6.2 mm or greater, about 6.3 mm or greater, about 6.4 mm or greater, about 6.5 mm or greater, about 6.6 mm or greater, about 6.7 mm or greater, about 6.8 mm or greater, about 6.9 mm or greater, about 7 mm or greater, about 7.1 mm or greater, about 7.2 mm or greater, about 7.3 mm or greater, about 7.4 mm or greater, about 7.5 mm or greater, about 7.6 mm or greater, about 7.7 mm or greater, about 7.8 mm or greater, about 7.9 mm or greater, about 8 mm or greater, about 8.1 mm or greater, about 8.2 mm or greater, about 8.3 mm or greater, about 8.4 mm or greater, about 8.5 mm or greater, about 8.6 mm or greater, about 8.7 mm or greater, about 8.8 mm or greater, about 8.9 mm or greater. In some specific examples, the saw blade 130 can have a thicknesses of about 2.38 mm (about 3/32"), about 2.54 mm (about 1/10"), about 3.18 mm (about 1/8"), about 3.97 mm (about 5/32"), about 4.76 mm (about 3/16"), about 5.56 mm (about 7/32"), and about 6.35 mm (about 1/4").

In other embodiments, since each of the motor 124 and/or the motorized unit 140 can include an electric motor (e.g., direct current or alternating current), a hydraulic motor, a pneumatic motor (e.g., gas or air), a fuel-powered motor/engine (e.g., gasoline, diesel, or propane), or other similar device, then the extendable saw 100 can be powered by electricity, compressed fluids, or compressed gases. In some embodiments, the extendable saw 100 can be powered by electricity, such as direct current or alternating current. The extendable saw 100 can include a power source, such as a power pack, a battery, or a power cell and/or contain a power plug (not shown). Alternatively, in other embodiments, the extendable saw 100 can include hydraulic or pneumatic inlets (not shown) for powering the motor 124 and/or the motorized unit 140.

In some embodiments, a magnetically attachable and extendable saw 100 can include the blade housing 110 coupled to the main body 102 by at least one extendable member 120. The blade housing 110 can at least partially cover the saw blade 130 and the extendable member 120 can be configured to move the blade housing 110 and the saw blade 130 between a retracted position and an extended position relative to the main body 102. The motorized unit 140 can be coupled to the saw blade 130 and configured to rotate or provide other blade movement to the saw blade 130. An electromagnet or a switchable magnet 150 can be disposed on the main body 102, and can include at least one contact surface 152 that can be adjustable or switchable between a magnetized state and a non-magnetized state. The magnetically attachable and extendable saw 100 can include the switch 156 that can be in electrical communication with the electromagnet or the switchable magnet 150 and can be configured to control the magnetized state and the non-magnetized state of the contact surface 152. The control system 158 can be operatively coupled to at least the extendable member 120, the motorized unit 140, and the electromagnet or the switchable magnet 150. The control system 158 can be configured to activate the magnetized state of the contact surface 152 prior to activating the rotation or other movement of the saw blade 130 via the motorized unit 140. The control system 158 can have a programmed feed system for controlling or operating the magnetized and non-magnetized states of the contact surface 152, the extendable member 120 (e.g., actuator) to move the blade housing 110 and the saw blade 130 between a retracted position and an extended position relative to the main body 102, and the motorized unit 140 for to rotate, drive, or provide blade movement to the saw blade 130. Therefore, in some embodiments, the programmed feed system in the control system can be used to ensure that the magnetized state of the contact surface 152 must be on and/or the contact surface 152 is secured to the work surface prior to and during the use of operating the saw blade 130.

In one or more embodiments, once the switch 156 is activated, the motorized unit 140 can rotate the saw blade 130 with or without a preprogrammed time delay, the extendable member 120 (e.g., actuator) can drive the blade housing 110 and the saw blade 130 to the extended position (e.g., cut length), then can drive the blade housing 110 and the saw blade 130 to the retracted position, and then can cease operation (e.g., stop rotation) of the saw blade 130. In some examples, the feed rate of the saw blade 130 can be programmed to not overload or over torque the saw blade 130.

Figure 4A:
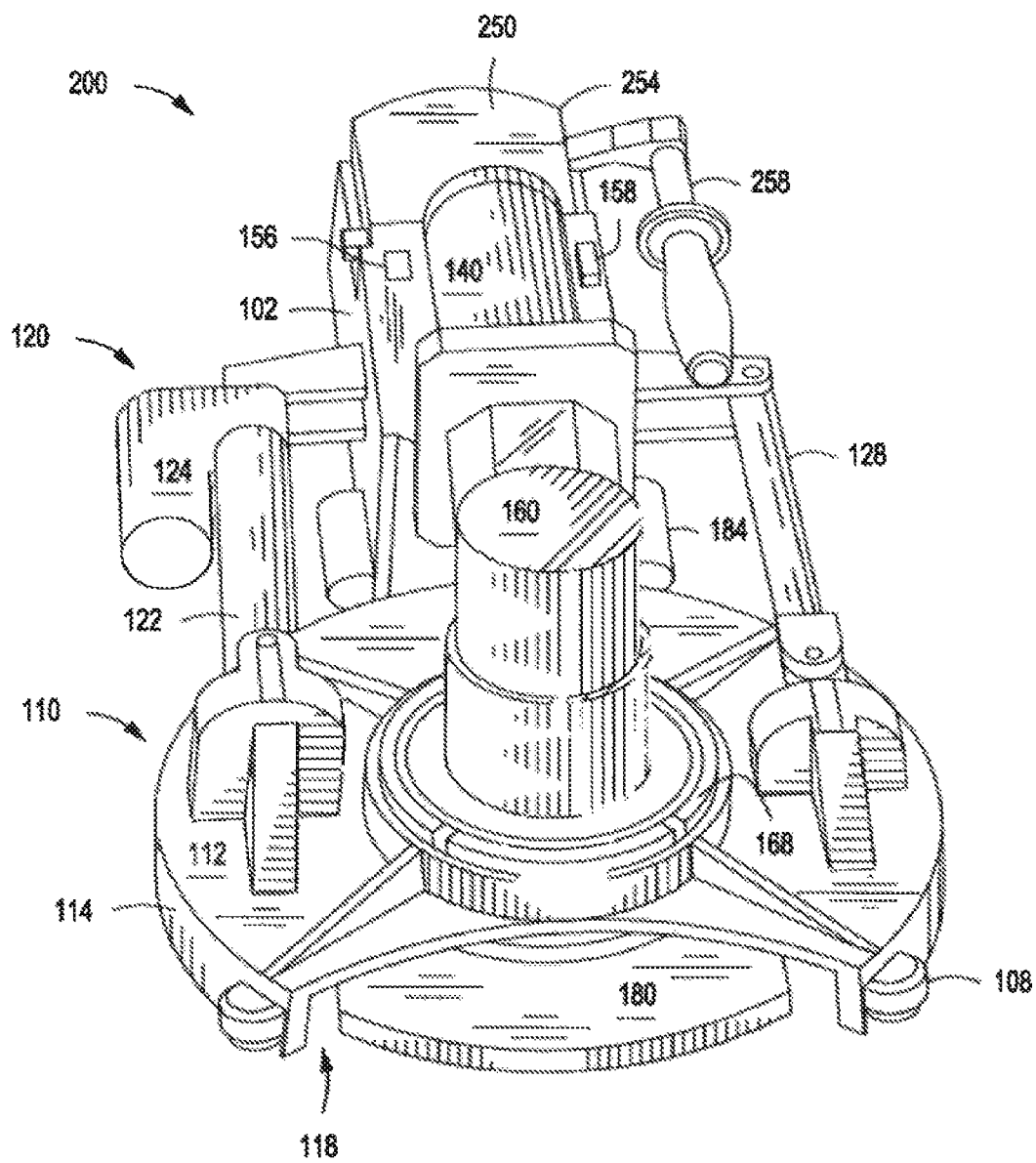
FIGS. 4A-4B depict perspective views of another illustrative magnetically attachable and extendable saw, according to one or more embodiments described.
Figure 4B:
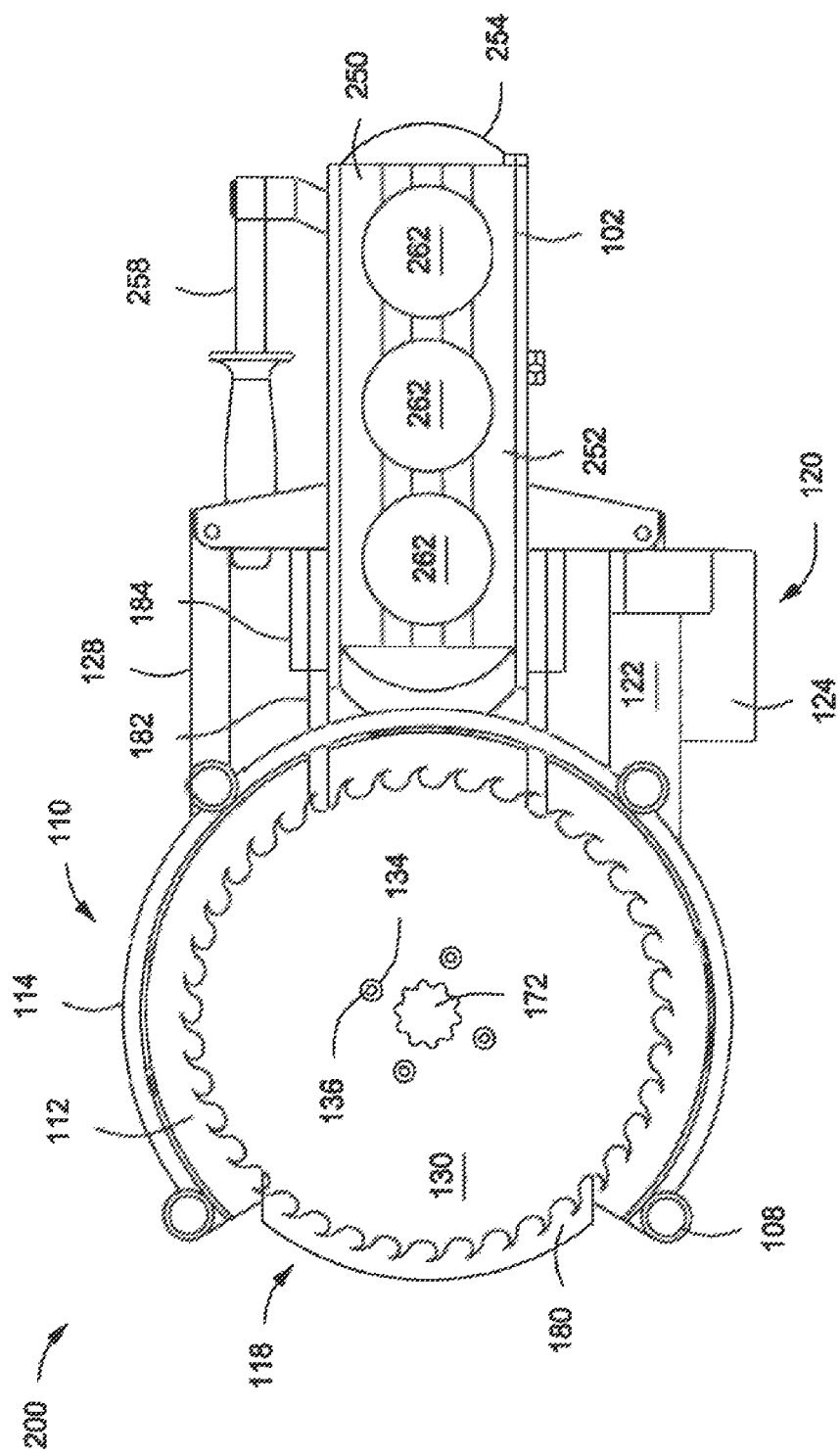

FIGS. 4A-4B depict perspective views of an illustrative magnetically attachable and extendable saw 200, according to one or more embodiments. In one embodiment, the extendable saw 200 can include the main body 102, the blade housing 110, and the extendable member 120 as described for the extendable saw 100. The extendable saw 200 or portions thereof depicted in FIGS. 4A-4B and the extendable saw 100 or portions thereof depicted FIGS. 1A-3 share many common components. It should be noted that like numerals shown in the Figures and discussed herein represent like components throughout the multiple embodiments disclosed herein.

In one or more embodiments, the main body 102 can include a switchable magnet 250 having at least one contact surface 252 that can be adjustable or switchable between a magnetized state ("on") and a non-magnetized state ("off"). The switchable magnet 250 can also include a magnet housing 254, one or more permanent magnets 262 disposed within the magnet housing 254, and a switch, a handle, a knob, or a lever 258 extending from the magnet housing 254. The permanent magnets 262 can be configured to provide the magnetized state and the non-magnetized state of the contact surface 252. The lever 258 can be configured to cause relative rotation of the permanent magnets 262 for controlling the magnetized state and the non-magnetized state of the contact surface 252. For example, the lever 258 can be pulled, pushed, switched, turned, rotated, twisted, and/or slid, in one or more directions to cause relative rotation of the permanent magnets 262 for controlling the magnetized state and the non-magnetized state of the contact surface 252. FIG. 4A-4B depict the lever 258 extending from one side of the switchable magnet 250, but the lever 258 can be configured to extend from any of sides or surfaces of the switchable magnet 250, the magnet housing 254, and/or the main body 102. In some examples, the lever 258 can be a handle or a knob extending from the upper surface of the magnet housing 254 (not shown).

For the extendable saw 200, the control system 158 can include a microprocessor controllers, switches, software, and/or other equipment that can control the various aspects and systems of the extendable saw 100, including, but not limited to, the powering and the rotational speed or other blade movement speed of the saw blade 130 and the movement of the blade housing 110 and the saw blade 130. In one example, a single engagement of the switch 156 can activate the control system 158 to power-up and rotate or otherwise provide blade movement to the saw blade 130 and can also extend the blade housing 110 and the saw blade 130 to the desired object to be cut. In another example, a single engagement of the switch 156 can activate the control system 158 to retract the blade housing 110 and the saw blade 130 to the retracted position and power-down the saw blade 130. In another example, a single engagement of the switch 156 can activate the control system 158 to power-up and rotate or otherwise provide blade movement to the saw blade 130, extend the blade housing 110 and the saw blade 130 to the desired object to be cut, cut the object, retract the blade housing 110 and the saw blade 130 to the retracted position, and power-down the saw blade 130.

In some exemplary embodiments, the magnetized state of the contact surface 252 can be activated via the lever 258 prior to engaging the switch 156 to activate the control system 158. In some embodiments, switches (e.g., kill switch or safety switch), sensors, locking mechanisms, and/or other electronic or mechanical devices (not shown) may be operatively coupled to the lever 258, the switch 156, the control system 158, the motorized unit 140, and/or other components of the extendable saw 200. The switches sensors, locking mechanisms, and/or other electronic or mechanical devices (not shown) may be configured to provide blade movement of the saw blade 130 once the magnetized state has been engaged and the contact surface 252 has been magnetically attached to the work surface and/or to cease blade movement of the saw blade 130 once the non-magnetized state has been engaged and the contact surface 252 has been magnetically detached from the work surface.

In some examples, the switch 156, the control system 158, and/or other components of the extendable saw 200 can be or include one or one kill switches, such as, for example, a torque kill switch. The kill switches (switch 156) can be operatively coupled to and in electrical communication with the motorized unit 140 and can be configured to cease blade movement of the saw blade 130. The one or more kill switches can be configured to disengage or break electrical communication between one or more power sources and the motorized unit 140 and/or the control system 158 upon sensing or registering a predetermined event occurrence, such as, for example, a maximum value of torque directly or indirectly exposed to or experienced by the saw blade 130, the gear unit 160, and/or the motorized unit 140. In other examples, the predetermined event occurrence for triggering the kill switch can be a partial, substantial, or complete loss of the magnetized state and/or a partial, substantial, or complete disengagement of the contact surface 252 from the work surface.

In one or more embodiments, the magnet housing 254 can be or include one or more materials having a low magnetic reluctance and/or a high magnetic reluctance. The low magnetic reluctance materials can be ferrimagnetic or ferromagnetic ("magnetically susceptible material"). The high magnetic reluctance materials can include, for example aluminum, magnesium, and/or carbon fiber. In one or more embodiments, within the magnet housing 254 a first magnet or "lower magnet" can be held in a fixed position beneath a second magnet or "upper magnet" that can be rotated about its axis. In one or more embodiments, the lower surface of the lower magnet can form part of the contact surface 252 of the switchable magnet 250. In one or more embodiments, the lower surface of the lower magnet can be recessed within the magnet housing 254, such that the sides of the magnet housing 254 provide a gap between a lower surface of the lower magnet and the contact surface 252 of the switchable magnet 250.

The switch or lever 258 can rotate the second magnet relative to the first magnet within the magnet housing 254. The second magnet can include a notch or groove configured to engage or receive a bar (not shown) in communication with the lever 258. The bar can be received inside a groove formed on a boss (not shown) that can be connected to the lever 258. The lever 258 can have two or more positions, at least one of which can be an "on" position and at least one of which can be an "off" position.

In one or more embodiments, rotating the second magnet 180° about its axis can align the poles of both the first magnet and the second magnet in the "on" position to produce an external magnetic field. When so aligned, the north (positive) and south (negative) poles of the second magnet can substantially overlie the north and south poles of the first magnet, creating a strong external magnetic field about the magnet housing 254. In one or more embodiments, at least a portion of the strong external magnetic field can be directed towards the contact surface 252 of the switchable magnet 250. The extendable saw 200 can magnetically attach the contact surface 252 to a magnetically susceptible surface (not shown) when switched to the "on" position.

In one or more embodiments, the magnet housing 254 can be or include one, two, or more pole pieces that can enhance the magnetic functionality of the switchable magnet 250. The shape or wall thickness of the pole pieces forming the magnet housing 254 can increase or decrease the external magnetic field strength. For example, to provide a higher external magnetic field, the pole pieces can be shaped in such a way that they reflect the variation of the magnetic field strength around the perimeter of the permanently magnetized first and second magnets.

In one or more embodiments, the switchable magnet 250 can include one, two, three, four, five, or more independent switchable magnets. In one or more embodiments, a switchable magnet 250 that includes a plurality of switchable magnets disposed within the magnet housing 254 can be switched between the "on" and "off" positions via a single switch, handle, knob, or lever 258. In one or more embodiments, a switchable magnet 250 that includes a plurality of switchable magnets disposed within the magnet housing 254 can include two or more switches, handles, knobs, or levers 258 that can switch one or more of the switchable magnets between the "on" position and the "off" position.

In one or more embodiments, the magnet housing 254 can provide a waterproof and/or dustproof housing to protect the one or more switchable magnets disposed therein. The switchable magnet 250 can be suitable for use in harsh, dusty, and/or wet environments. Additional details of a suitable switchable magnet 250 is further discussed and described in U.S. Pat. Nos. 6,707,360 and 7,012,495 and U.S. Patent Application No. 2004/0239460, which are incorporated by reference herein to the extent such disclosure is not inconsistent with this application and for all jurisdictions in which such incorporation is permitted.

In another embodiment, the switchable magnet 250 can include one, two, or more pole conduits, core elements, and/or combination carrier platter/core element assemblies (not shown) as one or more of the permanent magnets 262 disposed within the magnet housing 254 and forming the contact surface 252, as depicted in FIG. 4B. The magnet housing 254 and/or the permanent magnets 262 can be or include one, two, or more pole conduits, core elements, and/or combination carrier platter/core element assemblies which can provide the contact surface 252 with a magnetized state ("on") and a non-magnetized state ("off") by the manipulation of the lever 258. In some examples, the lever 258 can be configured to cause relative rotation of the permanent magnets 262 (and/or any portion of or any one, two, or more pole conduits, core elements, and/or combination carrier platter/core element assemblies) for controlling the magnetized state and the non-magnetized state of the contact surface 252. In other examples, instead of the lever 258, a knob or handle (not shown) can extend from the upper surface or other surface of the magnet housing 254 or the main body 102. The knob or the handle can be pulled, pushed, switched, turned, rotated, twisted, slid, in one or more directions to cause relative rotation of the permanent magnets 262 (and/or any portion of or any one, two, or more pole conduits, core elements, and/or combination carrier platter/core element assemblies) for controlling the magnetized state and the non-magnetized state of the contact surface 252.

In some embodiments, the contact surface 252 and/or each of the permanent magnets 262 can be or include a switchable core element-based permanent magnet apparatus, which contains two or more carrier platters having core elements. The core elements can be magnetically matched pole conduits attached to the north and south magnetic poles of one or more permanent magnets, inset into carrier platters. The pole conduits can include and redirect the magnetic field of the permanent magnets to the upper and lower faces of the carrier platters. By containing and redirecting the magnetic field within the pole conduits, like poles can have a simultaneous level of attraction and repulsion. Aligning upper core elements "in-phase" (e.g., north-north/south-south) with the lower core elements, can activate the apparatus and can provide the magnetized state ("on") by redirecting the combined magnetic fields of the pole conduits into the target. Anti-aligning upper core elements "out-of-phase" (e.g., north-south/south-north) with the lower core elements, can deactivate the apparatus and can provide the non-magnetized state ("off") resulting in pole conduits containing opposing fields.

In one or more embodiments, the switchable magnet 250 can include one, two, three, or more switchable core element-based permanent magnet apparatuses (not shown). Each switchable core element-based permanent magnet apparatus can include an upper carrier platter aligned above a lower carrier platter by a common axis. The upper carrier platter, the lower carrier platter, or both can be configured to be rotatable about the common axis for activating the magnetized and non-magnetized states of the at least one contact surface 252. The upper carrier platter can include two or more upper core elements having magnetically matched pole conduits and the lower carrier platters can include two or lower more core elements having magnetically matched pole conduits. The magnetically matched pole conduits of the upper core elements and the magnetically matched pole conduits of the lower core elements can be configured to be aligned, adjusted, or otherwise moved in phase to activate the magnetized state of the at least one contact surface 252 and configured to be anti-aligned, adjusted, or otherwise moved out of phase to activate the non-magnetized state of the at least one contact surface 252. Additional details of a suitable switchable magnet 250 is further discussed and described in U.S. Pat. Nos. 8,183,965, 8,256,098, and 8,350,663, which are incorporated by reference herein to the extent such disclosure is not inconsistent with this application and for all jurisdictions in which such incorporation is permitted.

In some embodiments, the magnetically attachable and extendable saw 200 can include the blade housing 110 coupled to the main body 102 by at least one extendable member 120, where the blade housing 110 can at least partially cover the saw blade 130 and the extendable member 120 can be configured to move the blade housing 110 and the saw blade 130 between a retracted position and an extended position relative to the main body 102, the motorized unit 140 coupled to the saw blade 130 and configured to rotate or provide other blade movement to the saw blade 130, the switchable magnet 250 disposed on the main body 102, where the switchable magnet 250 can include a magnet housing 254, at least two permanent magnets 262 disposed within the magnet housing 254, at least one contact surface 252 that can be adjustable or switchable between a magnetized state and a non-magnetized state, and a switch, a handle, a knob, or the lever 258 extending from the magnet housing 254 for causing relative rotation of the permanent magnets 262 and configured to control the magnetized state and the non-magnetized state of the contact surface 252, and the control system 158 operatively coupled to at least the extendable member 120 and the motorized unit 140, where the control system 158 can be configured to activate the magnetized state of the contact surface 252 prior to activating the rotation or other movement of the saw blade 130 via the motorized unit 140.

FIGS. 5A-5G depict perspective views of an illustrative magnetically attachable and extendable saw 300, according to one or more embodiments. In one embodiment, the extendable saw 300 can include a main body 302 and the blade housing 110 which can be coupled together by one or more extendable members 320. FIGS. 6A-6D depict other perspective views of portions of the extendable saw 300, such as the extendable member 320 disposed between the main body 302 and the blade housing 110, according to one or more embodiments. The extendable saw 300 or portions thereof depicted in FIGS. 5A-6D and the extendable saws 100 and 200 or portions thereof depicted FIGS. 1A-4B share many common components. It should be noted that like numerals shown in the Figures and discussed herein represent like components throughout the multiple embodiments disclosed herein.

The blade housing 110 can at least partially cover the saw blade 130 and the extendable member 320 can be configured to move the blade housing 110 and the saw blade 130 to, from, and/or between a retracted position and an extended position relative to the main body 302. FIGS. 5A, 5C, 5E-5G, 6A, and 6C depict the extendable saw 300 with the blade housing 110 and the saw blade 130 in the retracted position, while FIGS. 5B, 5D, 6B, and 6D depict the extendable saw 300 with the blade housing 110 and the saw blade 130 in the extended position. The extendable member 320 disposed between the main body 302 and the blade housing 110 is depicted by above perspective views illustrated in FIGS. 6A and 6C and by below perspective views illustrated in FIGS. 6B and 6D.

Figure 5A:
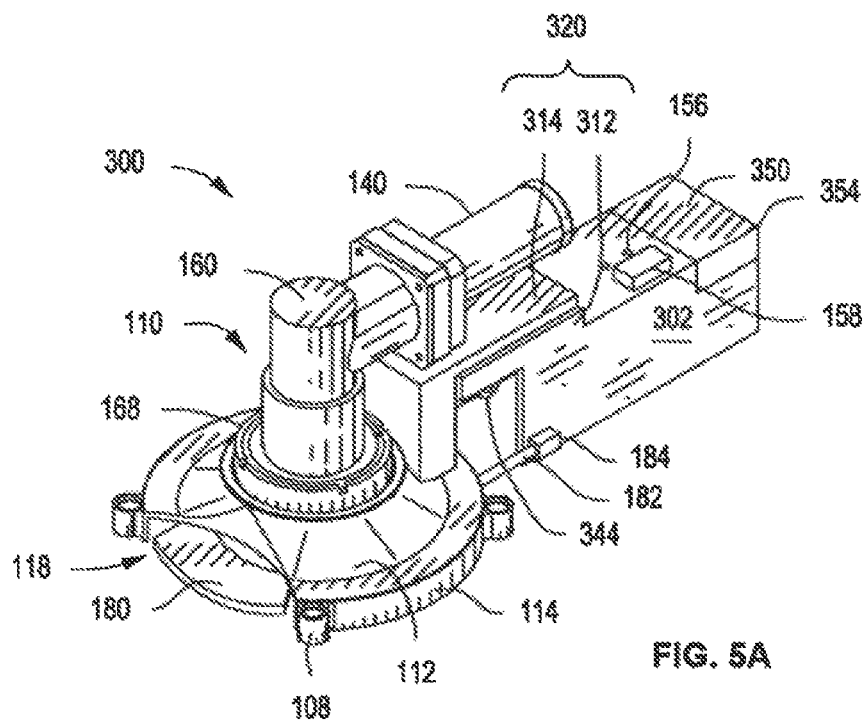
Figure 5B:
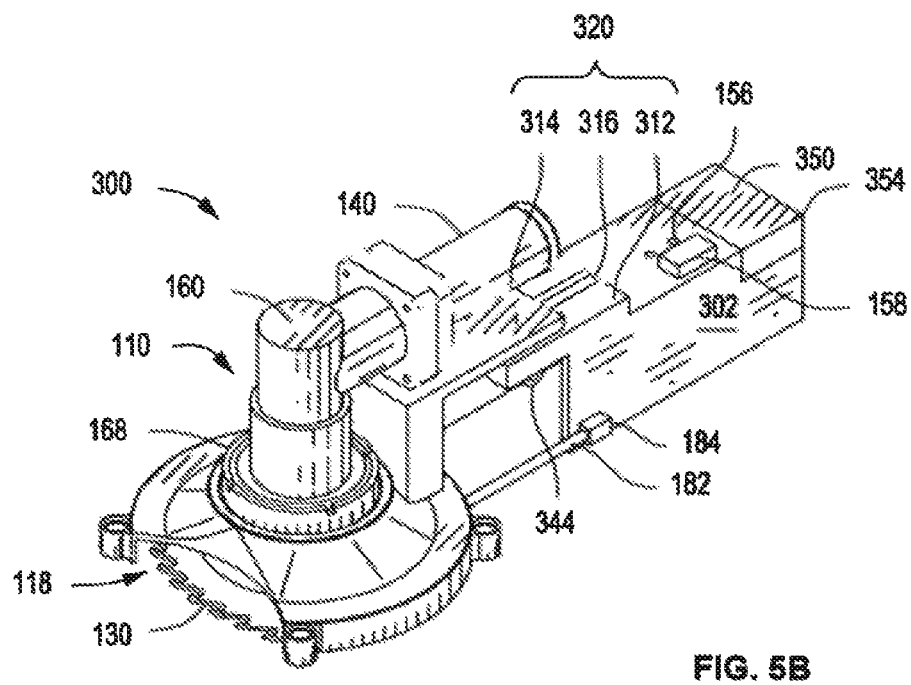
Figure 5C:
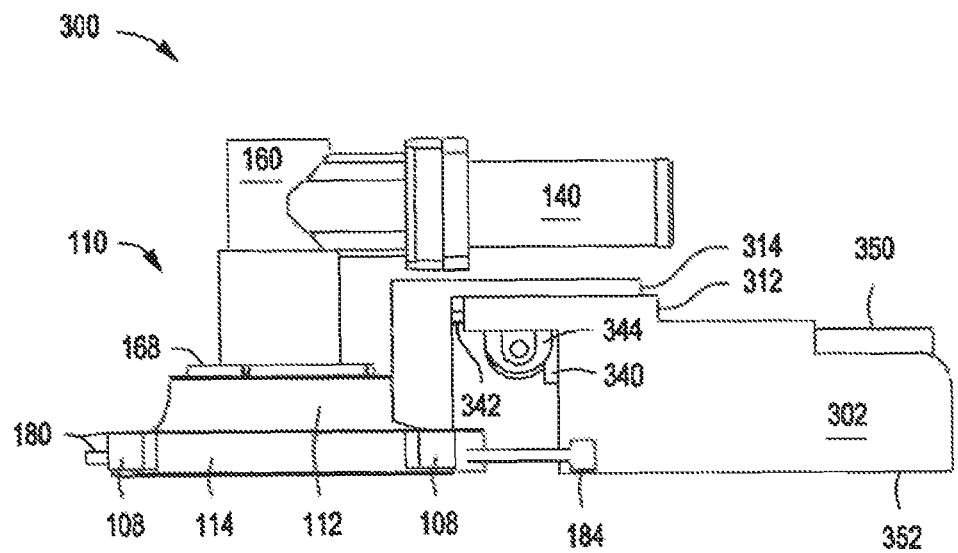
Figure 5D:
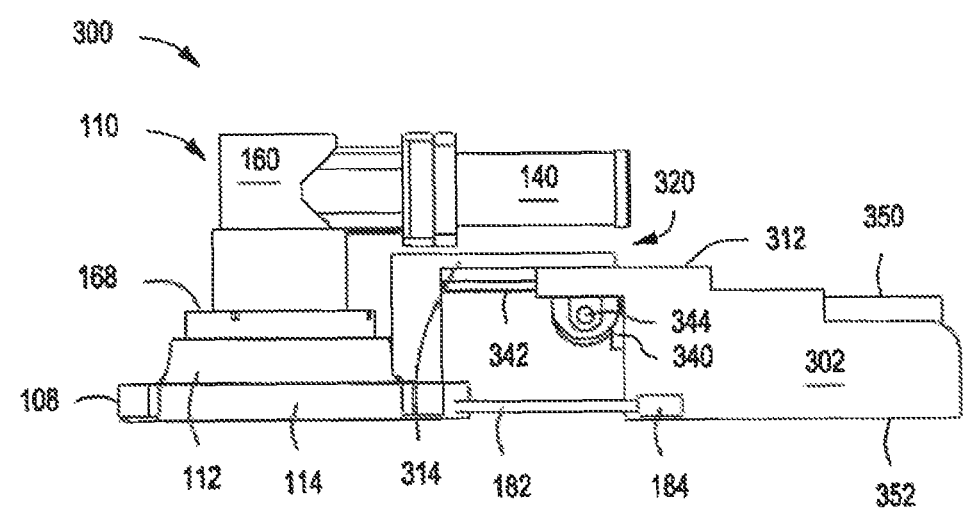

The extendable member 320 can be configured to provide directional guidance to the blade housing 110 and the saw blade 130 to, from, and/or between the retracted and extended positions. FIG. 5A depicts that the extendable member 320 can include a first segment 312 coupled to the main body 302 and a second segment 314 coupled to the blade housing 110, according to one or more embodiments. The first segment 312 and the second segment 314 can be coupled together and configured to slide or otherwise move parallel relative to each other. A guide track 316 disposed in the first segment 312, as depicted in the extended position in FIG. 5B, can be configured to receive a portion of the second segment 314 (not shown) for providing the extendable member 320 with the linear direction to, from, and/or between the retracted and extended positions. In other embodiments, not shown, the guide track 316 can be disposed in the second segment 314 and a portion of the first segment 312 can be configured to be receive by the guide track 136 for providing the extendable member 320 with the linear direction.

Figure 5G:
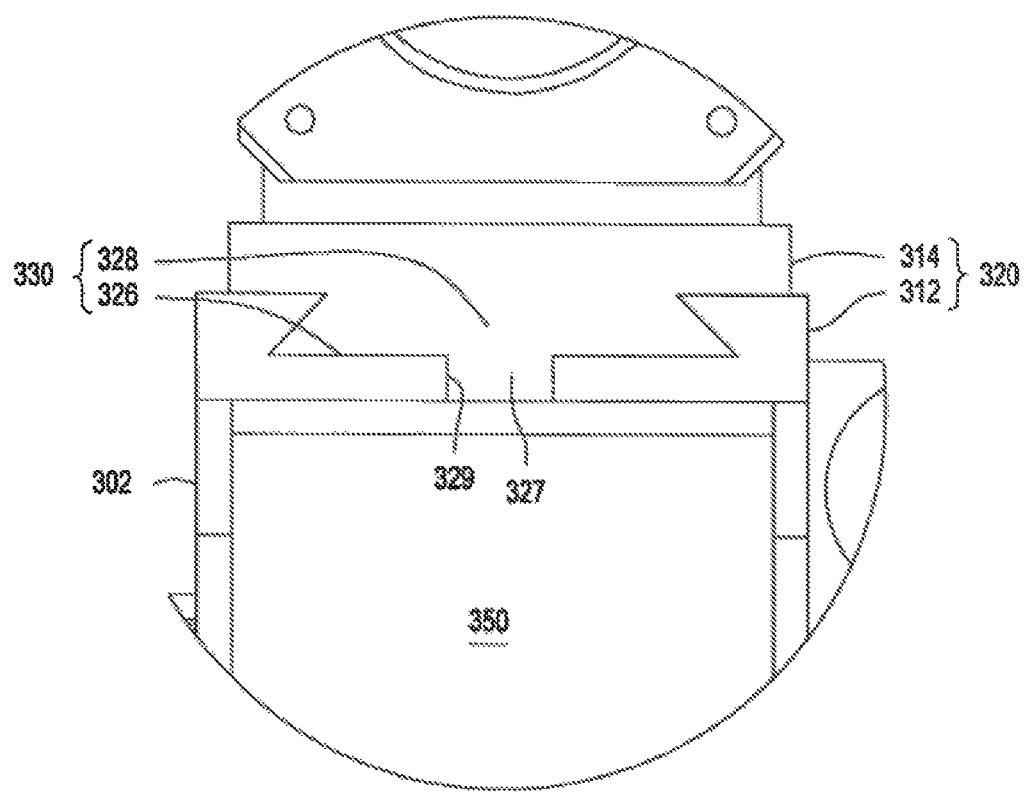
Figure 6A:
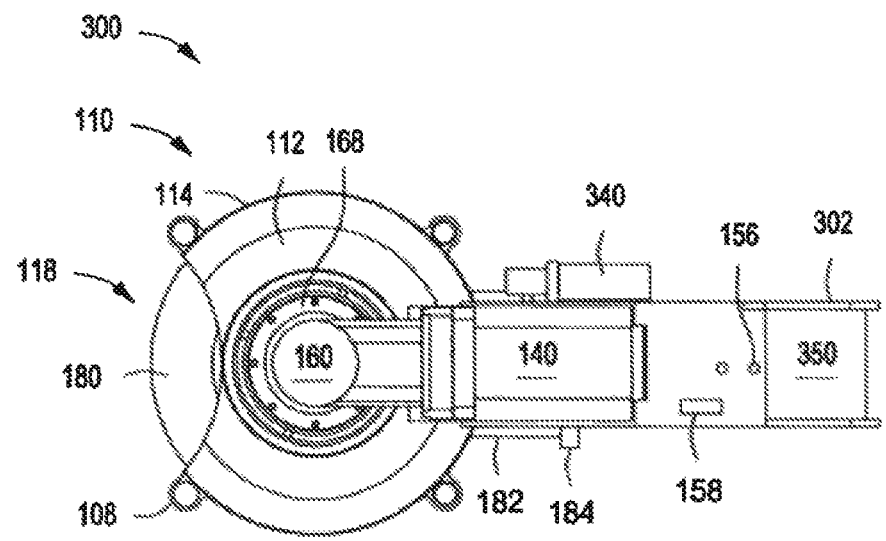
FIGS. 6A-6D depict other perspective views of portions of the illustrative magnetically attachable and extendable saw depicted in FIGS. 5A-5G, according to one or more embodiments described.
Figure 6B:
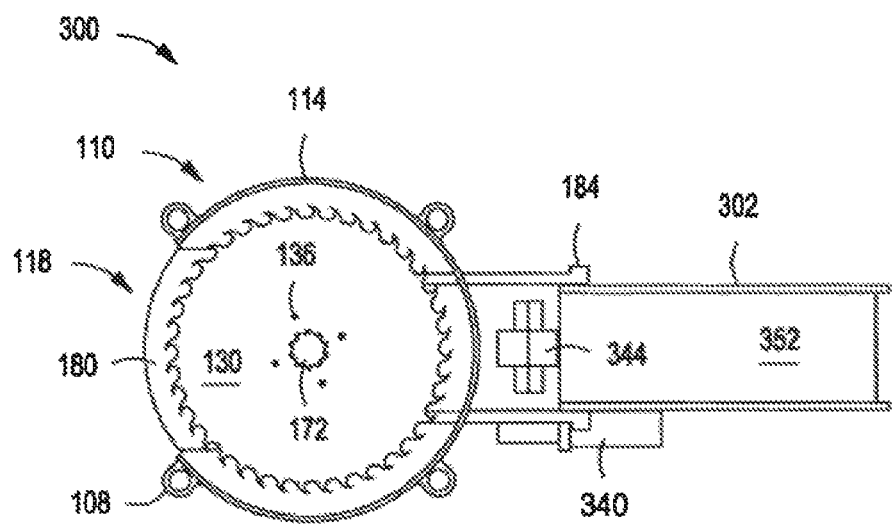
Figure 6C:
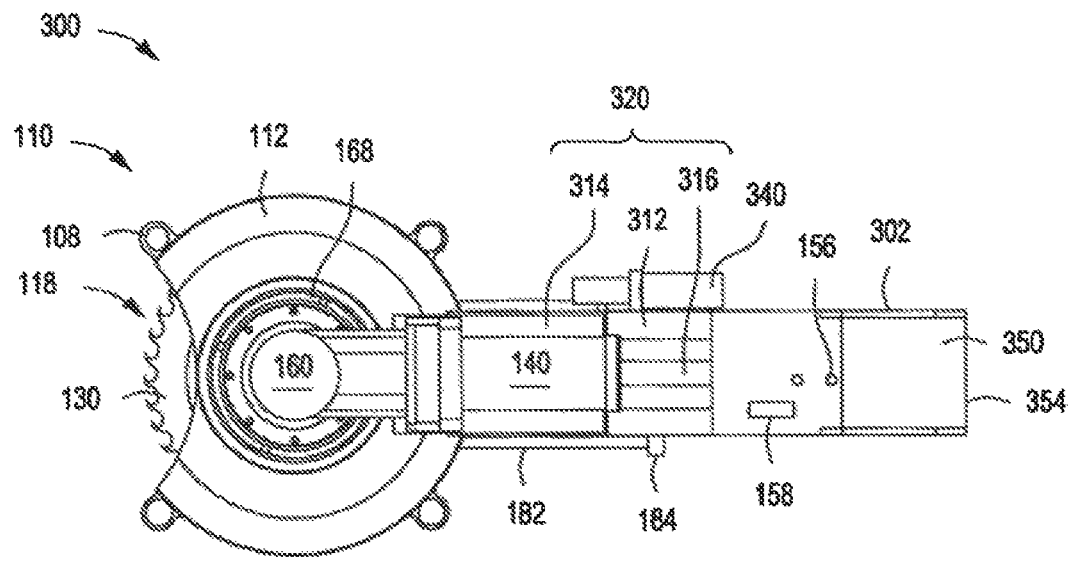
Figure 6D:
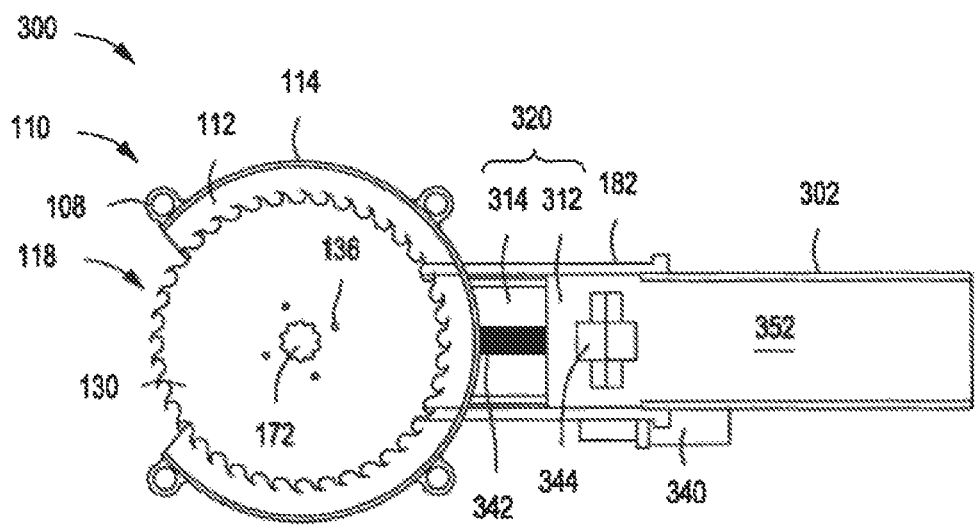

In some embodiments, as depicted in FIGS. 5F and 5G, a sliding male/female joint 330 can be disposed between the first segment 312 and the second segment 314 of the extendable member 320. The sliding male/female joint 330 can be configured to move the blade housing 110 and the saw blade 130 in a linear direction or a non-linear (e.g., curved or angular) direction to, from, and/or between the retracted and extended positions while the first segment 312 and the second segment 314 slide or otherwise move along sliding male/female joint 330. For example, the guide track 316 (depicted in FIG. 5B) can be a female portion 326 of the sliding male/female joint 330 disposed in the first segment 312 of the extendable member 320 and a male portion 328 of the sliding male/female joint 330 can be disposed on the second segment 314 of the extendable member 320, as depicted in FIGS. 5F and 5G. In some exemplary configurations, the sliding male/female joint 330 can be or include a dovetail joint, a grooved dovetail joint, a tongue and groove joint, a pin and slot joint, derivatives thereof, or any combination thereof. In some examples, the sliding male/female joint 330 can be a grooved dovetail joint, such that the male portion 328 can include a tongue 327 and the female portion 326 can include a groove 329, as depicted in FIG. 5G.

In another embodiment, an actuator unit can include a forward drive gear motor or actuator motor 340 which can be disposed on the extendable saw 300, such as the main body 302.

The actuator motor 340 can be configured to drive the extendable member 320 and can be operatively coupled to a rack gear 342 and a pinion gear 344 for driving the extendable member 320. The actuator motor 340 can include an electric motor (e.g., direct current or alternating current), a hydraulic motor, a pneumatic motor (e.g., gas or air), a fuel-powered motor/engine (e.g., gasoline, diesel, or propane), or other similar device. The actuator motor 340 can include the same type or a different type of motor as the motor 124 and/or the motorized unit 140.

In one embodiment, the actuator motor 340 can be disposed on the main body 302, the pinion gear 344 can be disposed on the first segment 312 of the extendable member 320, and the rack gear 342 can be disposed on the second segment 314 of the extendable member 320. In another embodiment, the actuator motor 340 can be disposed on the main body 302, the pinion gear 344 can be disposed on the second segment 314 of the extendable member 320, and the rack gear 342 can be disposed on the first segment 312 of the extendable member 320. In another embodiment, the actuator motor 340 and the pinion gear 344 can be disposed on the first segment 312 of the extendable member 320 and the rack gear 342 can be disposed on the second segment 314 of the extendable member 320. In another embodiment, the actuator motor 340 and the pinion gear 344 can be disposed on the second segment 314 of the extendable member 320 and the rack gear 342 can be disposed on the first segment 312 of the extendable member 320.

The main body 302 can include at least one switchable magnet 350 having at least one contact surface 352 that can be adjustable or switchable between a magnetized state and a non-magnetized state. In some embodiments, the switchable magnet 350 can be an electromagnet configured to provide the magnetized state and the non-magnetized state from a power source (not shown). For example, the switchable magnet 350 can be an electromagnet in electrical communication with the power source via an electrical control switch, such as the switch 156. The switch 156 can be configured to control the magnetized state and the non-magnetized state of the contact surface 352 by providing an electrical contact in the circuit or by breaking the electrical contact in the circuit. In other embodiments, the switchable magnet 350 can include permanent magnets configured to provide the magnetized state and the non-magnetized state of the contact surface 352. Depending on the type of magnets utilized in the switchable magnet 350, a magnet housing 354 can include various magnets (e.g., electromagnet or permanent magnets) and/or be a structural portion of the switchable magnet 350. For example, the switchable magnet 350 can include one or more electromagnets within the magnet housing 354 and the contact surface 352 of the electromagnet can be a lower surface of the magnet housing 354. In another example, the magnet housing 354 can be the outer surface of or other portion of one or more electromagnets that can form the switchable magnet 350 and the outer surface of the magnet housing 354 can be the contact surface 352.

In one or more embodiments, the magnet housing 354 can be or include one or more materials having a low magnetic reluctance and/or a high magnetic reluctance. The low magnetic reluctance materials can be ferrimagnetic or ferromagnetic ("magnetically susceptible material"). The high magnetic reluctance materials can include, for example aluminum, magnesium, and/or carbon fiber. In one or more embodiments, within the magnet housing 354, a first magnet or "lower magnet" can be held in a fixed position beneath a second magnet or "upper magnet" that can be rotated about its axis. In one or more embodiments, the lower surface of the lower magnet can form part of the contact surface 352 of the switchable magnet 350. In one or more embodiments, the lower surface of the lower magnet can be recessed within the magnet housing 354, such that the sides of the magnet housing 354 provide a gap between a lower surface of the lower magnet and the contact surface 352 of the switchable magnet 350.

The switch 156 or the lever (not shown) can rotate the second magnet relative to the first magnet within the magnet housing 354. The second magnet can include a notch or groove configured to engage or receive a bar (not shown) in communication with the switch 156 or the lever (not shown). The bar can be received inside a groove formed on a boss (not shown) that can be connected to the switch 156 or the lever (not shown). The switch 156 or the lever (not shown) can have two or more positions, at least one of which can be an "on" position and at least one of which can be an "off" position.

In one or more embodiments, rotating the second magnet 180° about its axis can align the poles of both the first magnet and the second magnet in the "on" position to produce an external magnetic field. When so aligned, the north (positive) and south (negative) poles of the second magnet can substantially overlie the north and south poles of the first magnet, creating a strong external magnetic field about the magnet housing 354. In one or more embodiments, at least a portion of the strong external magnetic field can be directed towards the contact surface 352 of the switchable magnet 350. The extendable saw 300 can magnetically attach the contact surface 352 to a magnetically susceptible surface (not shown) when switched to the "on" position.

In one or more embodiments, the magnet housing 354 can be or include one, two, or more pole pieces that can enhance the magnetic functionality of the switchable magnet 350. The shape or wall thickness of the pole pieces forming the magnet housing 354 can increase or decrease the external magnetic field strength. For example, to provide a higher external magnetic field, the pole pieces can be shaped in such a way that they reflect the variation of the magnetic field strength around the perimeter of the permanently magnetized first and second magnets.

In one or more embodiments, the switchable magnet 350 can include one, two, three, four, five, or more independent switchable magnets. In one or more embodiments, a switchable magnet 350 that includes a plurality of switchable magnets disposed within the magnet housing 354 can be switched between the "on" and "off" positions via a single handle, knob, lever, or switch 156. In one or more embodiments, a switchable magnet 350 that includes a plurality of switchable magnets disposed within the magnet housing 354 can include two or more switches, handles, knobs, levers, or switches 156 that can switch one or more of the switchable magnets between the "on" position and the "off" position.

In one or more embodiments, the magnet housing 354 can provide a waterproof and/or dustproof housing to protect the one or more switchable magnets disposed therein. The switchable magnet 350 can be suitable for use in harsh, dusty, and/or wet environments. Additional details of a suitable switchable magnet 350 is further discussed and described in U.S. Pat. Nos. 6,707,360 and 7,012,495 and U.S. Patent Application No. 2004/0239460, which are incorporated by reference herein to the extent such disclosure is not inconsistent with this application and for all jurisdictions in which such incorporation is permitted.

In another embodiment, the switchable magnet 350 can include one, two, or more pole conduits, core elements, and/or combination carrier platter/core element assemblies (not shown) as one or more of the permanent magnets disposed within the magnet housing 354 and forming the contact surface 352. The magnet housing 354 and/or the permanent magnets can be or include one, two, or more pole conduits, core elements, and/or combination carrier platter/ core element assemblies which can provide the contact surface 352 with a magnetized state ("on") and a non-magnetized state ("off") by the manipulation of the switch 156 or the lever (not shown). In some examples, the switch 156 or the lever (not shown) can be configured to cause relative rotation of the permanent magnets (and/or any portion of or any one, two, or more pole conduits, core elements, and/or combination carrier platter/core element assemblies) for controlling the magnetized state and the non-magnetized state of the contact surface 352. In other examples, instead of the switch 156 or the lever (not shown), a knob or a handle (not shown) can extend from the upper surface or other surface of the magnet housing 354 or the main body 302. The knob or the handle can be pulled, pushed, switched, turned, rotated, twisted, slid, in one or more directions to cause relative rotation of the permanent magnets (and/or any portion of or any one, two, or more pole conduits, core elements, and/or combination carrier platter/ core element assemblies) for controlling the magnetized state and the non-magnetized state of the contact surface 352.

In some embodiments, the contact surface 352 and/or each of the permanent magnets can be or include a switchable core element-based permanent magnet apparatus, which contains two or more carrier platters having core elements. The core elements can be magnetically matched pole conduits attached to the north and south magnetic poles of one or more permanent magnets, inset into carrier platters. The pole conduits can include and redirect the magnetic field of the permanent magnets to the upper and lower faces of the carrier platters. By containing and redirecting the magnetic field within the pole conduits, like poles can have a simultaneous level of attraction and repulsion. Aligning upper core elements "in-phase" (e.g., north-north/south-south) with the lower core elements, can activate the apparatus and can provide the magnetized state ("on") by redirecting the combined magnetic fields of the pole conduits into the target. Anti-aligning upper core elements "out-of-phase" (e.g., north-south/south-north) with the lower core elements, can deactivate the apparatus and can provide the non-magnetized state ("off") resulting in pole conduits containing opposing fields.

In one or more embodiments, the switchable magnet 350 can include one, two, three, or more switchable core element-based permanent magnet apparatuses (not shown). Each switchable core element-based permanent magnet apparatus can include an upper carrier platter aligned above a lower carrier platter by a common axis. The upper carrier platter, the lower carrier platter, or both can be configured to be rotatable about the common axis for activating the magnetized and non-magnetized states of the at least one contact surface 352. The upper carrier platter can include two or more upper core elements having magnetically matched pole conduits and the lower carrier platters can include two or lower more core elements having magnetically matched pole conduits. The magnetically matched pole conduits of the upper core elements and the magnetically matched pole conduits of the lower core elements can be configured to be aligned, adjusted, or otherwise moved in phase to activate the magnetized state of the at least one contact surface 352 and configured to be anti-aligned, adjusted, or otherwise moved out of phase to activate the non-magnetized state of the at least one contact surface 352.

Additional details of a suitable switchable magnet 350 is further discussed and described in U.S. Pat. Nos. 8,183,965, 8,256,098, and 8,350,663, which are incorporated by reference herein to the extent such disclosure is not inconsistent with this application and for all jurisdictions in which such incorporation is permitted.

In some embodiments, the magnetically attachable and extendable saw 300 can include the blade housing 110 coupled to the main body 302 by at least one extendable member 320, where the blade housing 110 can at least partially cover the saw blade 130 and the extendable member 320 can be configured to move the blade housing 110 and the saw blade 130 between a retracted position and an extended position relative to the main body 302, the motorized unit 140 coupled to the saw blade 130 and configured to rotate or provide other blade movement to the saw blade 130, the switchable magnet 350 disposed on the main body 302, where the switchable magnet 350 can include a magnet housing 354, at least two permanent magnets disposed within the magnet housing 354, at least one contact surface 352 that can be adjustable or switchable between a magnetized state and a non-magnetized state, and a switch, a handle, a knob, or the switch 156 or the lever (not shown) extending from the magnet housing 354 for causing relative rotation of the permanent magnets and configured to control the magnetized state and the non-magnetized state of the contact surface 352, and the control system 158 operatively coupled to at least the extendable member 320 and the motorized unit 140, where the control system 158 can be configured to activate the magnetized state of the contact surface 352 prior to activating the rotation or other movement of the saw blade 130 via the motorized unit 140.

In operation, the extendable saw 100, 200, 300 can be disposed one or more magnetically susceptible work surfaces (not shown) that contain one or more objects (not shown) to be cut and separated from the respective work surface. For example, the contact surface 152, 252, 352 of the switchable magnet 150, 250, 350 can be disposed on the work surface proximate to the object to be cut. The switchable magnet 150, 250, 350 can be switched from the "off" position to the "on" position via the switch 156 or the lever 258, thereby securing the extendable saw 100, 200, 300 to the work surface. Also, by actuating the switch 156 to activate the control system 158, the blade housing 110 and the saw blade 130 can be linearly or non-linearly advanced toward the object by the extendable member 120, 320 and/or activate the rotation or other blade movement of the saw blade 130 via the motorized unit 140. The extendable member 120, 320 can be linearly or non-linearly advanced horizontally along the work surface, such that the saw blade 130 contacts the object disposed on the work surface. The extendable member 120, 320 can apply the saw blade 130 with sufficient horizontal force directed towards the object so that the saw blade 130 can cut through the object via the combined horizontal force and the blade movement (e.g., rotation movement for circular blade) of the saw blade 130. The contact surface 152, 252, 352 of the switchable magnet 150, 250, 350 can remain in contact with the work surface while the extendable member 120, 320 exerts the horizontal force toward the object. The switch 156 can be actuated to retract the extendable member 120, 320 along with the blade housing 110 and the saw blade 130, as well as to deactivate the rotation or other blade movement of the saw blade 130.

In one or more embodiments, the switchable magnet 150, 250, 350 can be disposed on the work surface via the contact surface 152, 252, 352 by a magnetic strength or force of about 20 kilogram-force (kgf) or more, about 50 kgf or more, about 100 kgf or more, about 250 kgf or more, about 500 kgf or more, about 1,000 kgf or more, about 1,500 kgf or more, about 1,800 kgf or more, about 2,000 kgf or more, about 2,500 kgf or more, or about 2,700 kgf or more. In other embodiments, the extendable member 120, 320 can apply the saw blade 130 with horizontal force of about 20 kgf or more, about 50 kgf or more, about 100 kgf or more, about 250 kgf or more, about 500 kgf or more, about 1,000 kgf or more, about 1,500 kgf or more. In one example, the switchable magnet 150, 250, 350 can generate a magnetic strength or force of about 1,800 kgf (about 3,969 pound-force) and the extendable member 120, 320 can apply the saw blade 130 with horizontal force of about 275 kgf (about 606 pound-force).

Figure 7A:
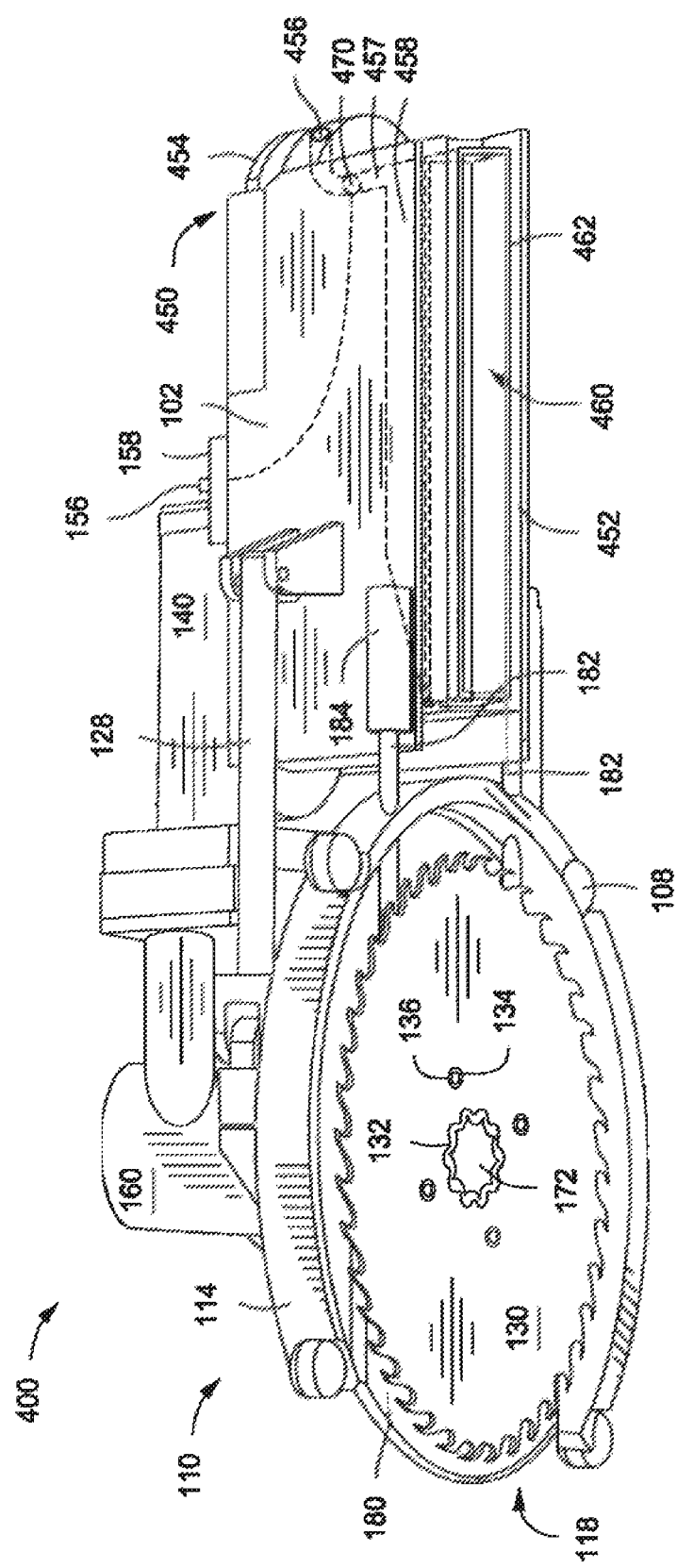
FIGS. 7A-7B depict perspective views of an illustrative vacuum-attachable and extendable saw, according to one or more embodiments described.
Figure 7B:
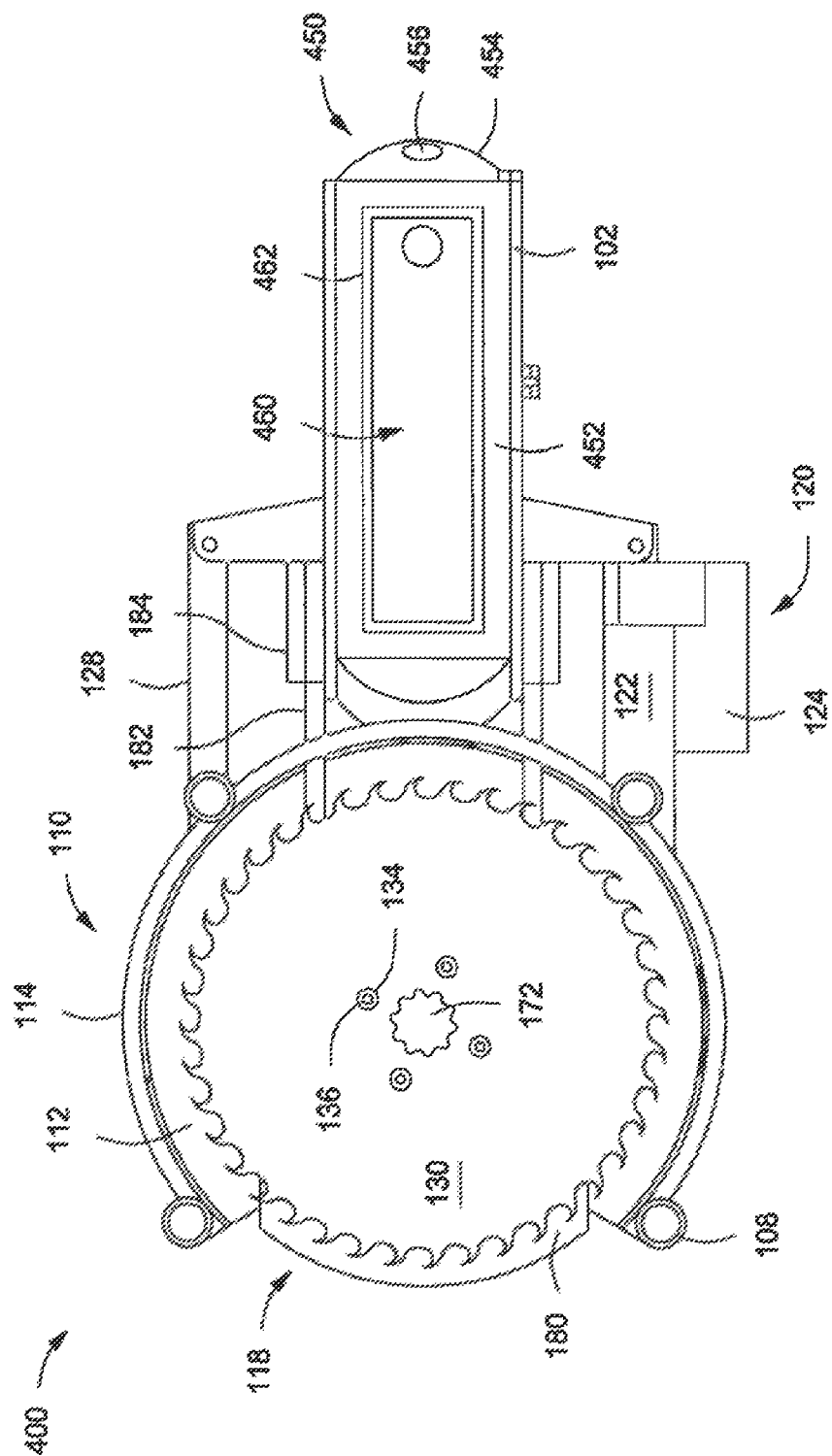

FIGS. 7A-7B depict perspective views of a vacuum-attachable and extendable saw 400, according to one or more embodiments. In one embodiment, the extendable saw 400 can include the main body 102, the blade housing 110, and the extendable member 120 as described for the extendable saw 100. The extendable saw 400 or portions thereof depicted in FIGS. 7A-7B and the extendable saw 100 or portions thereof depicted FIGS. 1A-3 share many common components. It should be noted that like numerals shown in the Figures and discussed herein represent like components throughout the multiple embodiments disclosed herein.

In one or more embodiments, the main body 102 can include at least one vacuum-attachable unit 450 having at least one contact surface 452 that can be adjustable or switchable between an evacuated state and a non-evacuated state. In some examples, the evacuated state can be considered an attached state and the non-evacuated state can be considered a released state. The contact surface 452 can contain one or more openings 460 and one or more seals 462, such as a gasket or an O-ring, surrounding each the openings 460. The vacuum-attachable unit 450 can be disposed on and/or adhered to a work surface via the contact surface 452 by a generated vacuum.

In some embodiment, the vacuum-attachable unit 450 can also include a vacuum unit housing 454 having one or more vacuum ports 456 in fluid communication with the opening 460, as depicted in FIG. 7A. One end of the vacuum port 456 can be configured to couple to a vacuum line or hose via a fitting, a nozzle, or another type of adaptor (not shown). Such vacuum line or hose can be in fluid communication with a vacuum system (e.g., in-house vacuum or an independent vacuum) configured to generate a vacuum. The other end of the vacuum port 456 can be directly or indirectly in fluid communication with one or more openings 460. In one embodiment, the vacuum port 456 can be directly coupled to one or more openings 460.

In other embodiments, the vacuum-attachable unit 450 can also include one or more passageways 457 and/or one or more one or more vacuum chambers 458 directly or indirectly in fluid communication with and disposed between one or more vacuum ports 456 and one or more openings 460. In one embodiment, as depicted in FIG. 7A, the vacuum unit housing 454 can include the passageway 457 in fluid communication with and disposed between the vacuum port 456 and the vacuum chamber 458, and can include the vacuum chamber 458 in fluid communication with and disposed between the passageway 457 and the opening 460. The passageway 457 and/or the vacuum chamber 458 can independently be optional components which can be a single component or can be incorporated as a portion of the vacuum port 456 and/or the opening 460.

In some examples, the passageway 457 and/or the vacuum chamber 458 can independently be formed within the vacuum unit housing 454 or other portions of the vacuum-attachable unit 450. In other examples, the passageway 457 and/or the vacuum chamber 458 can independently be one or more pipes, hoses, lines, conduits, ducts, or the like. In another embodiment, a control valve 470 can be disposed between the vacuum port 456 and the opening 460 or can be disposed between the vacuum port 456 and the vacuum chamber 458. The control valve 470 can be configured to be placed in an opened-position and a closed-position and can be in operable communication with the control system 158 and/or the switch 156. In one embodiment, the control valve 470 can be placed in the opened-position to provide a static vacuum or placed in the closed-position to provide a non-static vacuum. Both static and non-static vacuums can be utilized to maintain the evacuated state and attached state.

In some embodiment, the control system 158 and/or the switch 156 can be operatively coupled to at least the motorized unit 140, the vacuum-attachable unit 450, and/or the extendable member 120. In one embodiment, the control system 158 and/or the switch 156 can be configured to control the evacuated/non-evacuated states and the attached/released states. In operation, the extendable saw 400 can be disposed one or more non-magnetically susceptible work surfaces and/or one or more magnetically susceptible work surfaces (not shown) that contain one or more objects (not shown) to be cut and separated from the respective work surface. For example, the contact surface 452 of the extendable saw 400 can be disposed on the work surface proximate to the object to be cut. The vacuum-attachable unit 450 can be switched from the "off" position to the "on" position via the switch 156, thereby securing the extendable saw 400 to the work surface. Also, by actuating the switch 156 to activate the control system 158, the blade housing 110 and the saw blade 130 can be linearly or non-linearly advanced toward the object by the extendable member 120 and/or activate the rotation or other blade movement of the saw blade 130 via the motorized unit 140. The extendable member 120 can be linearly or non-linearly advanced horizontally along the work surface, such that the saw blade 130 contacts the object disposed on the work surface. The extendable member 120 can apply the saw blade 130 with sufficient horizontal force directed towards the object so that the saw blade 130 can cut through the object via the combined horizontal force and the blade movement (e.g., rotation movement for circular blade) of the saw blade 130. The contact surface 452 of the vacuum-attachable unit 450 can remain in contact with the work surface while the extendable member 120 exerts the horizontal force toward the object. The switch 156 can be actuated to retract the extendable member 120 along with the blade housing 110 and the saw blade 130, as well as to deactivate the rotation or other blade movement of the saw blade 130.

In one or more embodiments, the vacuum-attachable unit 450 of the extendable saw 400 can be disposed on the work surface via the contact surface 452 by a vacuum strength or force of about 20 kgf or more, about 50 kgf or more, about 100 kgf or more, about 250 kgf or more, about 500 kgf or more, about 1,000 kgf or more, about 1,500 kgf or more, about 1,800 kgf or more, about 2,000 kgf or more, about 2,500 kgf or more, or about 2,700 kgf or more. In one example, the vacuum-attachable unit 450 can generate a magnetic strength or force of about 1,800 kgf (about 3,969 pound-force) and the extendable member 120 can apply the saw blade 130 with horizontal force of about 275 kgf (about 606 pound-force).

In another exemplary embodiment, a method for removing an object protruding from a work surface with an extendable saw can include positioning the extendable saw on or adjacent to the work surface, the extendable saw can include a main body, a blade housing coupled to the main body by at least one extendable member, where the blade housing at least partially covers a saw blade and the extendable member can be configured to move the blade housing and the saw blade between a retracted position and an extended position relative to the main body, a motorized unit coupled to the saw blade and configured to rotate or provide other blade movement to the saw blade, and a switchable magnet disposed on the main body and having at least one contact surface that can be adjustable or switchable between a magnetized state and a non-magnetized state, attaching the extendable saw to the work surface by activating the switchable magnet to provide the magnetized state of the contact surface, rotating or providing other blade movement to the saw blade via the motorized unit, extending or otherwise moving the blade housing and the saw blade from the retracted position towards the object protruding from the work surface, where the object can be disposed to, from, and/or between the retracted and extended positions, and cutting through the object with the saw blade to separate the object from the work surface.

In some embodiments, the method can include using a constant or continuous motion when retracting, extending, or otherwise moving the blade housing and the saw blade between the retracted position and the extended position. In some example, a smoother or less rough work surface can be formed by the saw blade if the blade housing and the blade are moved with a constant or continuous motion between the retracted position and the extended position than if the blade housing and the blade are moved with an inconsistent or non-continuous motion between the retracted position and the extended position.

In some embodiments, the method can also include maintaining a blade guard in a stationary position as the blade housing and the saw blade extend from the retracted position so that the saw blade can be at least partially, substantially, or completely revealed or exposed within a cutting window of the blade housing as the saw blade moves away from the blade guard and the main body.

In other embodiments, the method can also include retracting or otherwise moving the blade housing and the saw blade to the retracted position subsequent to cutting through the object.

In some embodiments, the method can also include maintaining a blade guard in a stationary position as the blade housing and the saw blade move towards the retracted position so that the saw blade can be at least partially, substantially, or completely concealed or covered by the blade guard within the cutting window as the saw blade moves towards the blade guard and the main body.

In some embodiments, the method can also include that the switchable magnet can include an electromagnet configured to provide the magnetized state and the non-magnetized state of the contact surface.

In other embodiments, the method can also include that the switchable magnet can include a magnet housing, permanent magnets disposed within the magnet housing and configured to provide the magnetized state and the non-magnetized state of the contact surface, and a switch or a lever extending from the magnet housing and configured to cause relative rotation of the permanent magnets for controlling the magnetized state and the non-magnetized state of the contact surface.

In some embodiments, the work surface described can contain or can be any suitable magnetically susceptible material, which can include, but is not limited to, iron, steel, magnetically susceptible stainless steel, other ferrous metals, ferrous alloys, and combinations thereof. The magnetically susceptible material can be a composite material having both magnetically susceptible and non-magnetically susceptible components. In one or more embodiments, a non-magnetically susceptible work surface can be disposed on the magnetically susceptible work surface. The non-magnetically susceptible work surface can be thin enough to allow at least one of the switchable magnets, when in the "on" position to magnetically attach to the magnetically susceptible work surface.

In other embodiments, the work surface described can contain or can be any suitable non-magnetically susceptible material, which can include, but is not limited to, aluminum and aluminum alloys, titanium and titanium alloys, non-magnetically susceptible stainless steel, other non-ferrous metals or alloys, plastic, polymeric, or oligomeric materials, carbon-based or carbon fiber materials, masonry materials (e.g., concrete, brick, or stone), or combinations thereof. The non-magnetically susceptible material can be a composite material having both magnetically susceptible and non-magnetically susceptible components. In one or more embodiments, the extendable saw 400 can be attached to a non-magnetically susceptible work surface and/or the magnetically susceptible work surface.

The object to be cut by the extendable saw and the work surface can be made from the same material or different materials. The object to be cut can be metal, non-metal, or a combination thereof. The object to be cut and/or a non-magnetically susceptible work surface disposed on the magnetically susceptible work surface can be fiberglass, wood, plastic or polymeric materials, carbon-based or carbon fiber materials, and the like. In many embodiments, the object to be cut can be or include metal, such as steel pieces, angle irons, handrails, key plates, pipes, and other metal workpieces.

Other embodiments relate to any one or more of the following paragraphs:

1. A magnetically attachable and extendable saw, comprising: a main body; a blade housing coupled to the main body by at least one extendable member, wherein the blade housing at least partially covers a saw blade and the extendable member is configured to move the blade housing and the saw blade between a retracted position and an extended position relative to the main body; a motorized unit coupled to the saw blade and configured to rotate or provide other blade movement to the saw blade; and a switchable magnet disposed on the main body and comprising at least one contact surface that is switchable between a magnetized state and a non-magnetized state.

2. The magnetically attachable and extendable saw of paragraph 1, wherein the switchable magnet is an electromagnet in electrical communication with a switch and configured to control the magnetized state and the non-magnetized state of the contact surface.

3. The magnetically attachable and extendable saw of paragraph 1 or 2, further comprising a control system operatively coupled to at least the motorized unit and the switchable magnet, wherein the control system is configured to activate the magnetized state of the contact surface prior to activating the rotation or other blade movement of the saw blade via the motorized unit.

4. The magnetically attachable and extendable saw of paragraph 3, wherein the electromagnet magnet further comprises a magnet housing and the contact surface of the electromagnet magnet is a lower surface of the magnet housing.

5. The magnetically attachable and extendable saw of paragraph 4, wherein the control system is configured to cease rotation or other blade movement of the saw blade via the motorized unit if the magnetized state switches to the non-magnetized state.

6. The magnetically attachable and extendable saw of paragraph 5, wherein the control system comprises a microprocessor.

7. The magnetically attachable and extendable saw of paragraph 1, wherein the a switchable magnet further comprises a magnet housing, at least two permanent magnets disposed within the magnet housing, and a switch extending from the magnet housing for causing relative rotation of the permanent magnets.

8. The magnetically attachable and extendable saw of any one of paragraphs 1 to 8, wherein the at least one extendable member is adapted to move the blade housing and the saw blade in a linear direction or a non-liner direction between the retracted position and the extended position.

9. The magnetically attachable and extendable saw of paragraph 8, wherein the extendable member comprises an actuator unit coupled to and configured to be driven by a motor.

10. The magnetically attachable and extendable saw of paragraph 9, wherein the actuator unit comprises a linear actuator.

11. The magnetically attachable and extendable saw of paragraph 9 or 10, wherein the motor coupled to the actuator unit comprises an electric motor, a hydraulic motor, or a pneumatic motor.

12. The magnetically attachable and extendable saw of any one of paragraphs 1, 8 to 11, further comprising a hinge impingement coupled to the main body and the blade housing, wherein the hinge impingement and the linear actuator are configured to pivot the blade housing and the saw blade in the non-linear direction between the retracted position and the extended position.

13. The magnetically attachable and extendable saw of any one of paragraphs 1 to 12, wherein the extendable member can be configured to move the saw blade a predetermined cut distance or a stroke, such as, for example, within a range from about 1 inch to about 6 inches, more narrowly within a range from about 1.5 inches to about 5 inches, more narrowly within a range from about 2 inches to about 4 inches, and more narrowly within a range from about 2.5 inches to about 3 inches.

14. The magnetically attachable and extendable saw of any one of paragraphs 1 to 13, wherein the extendable member further comprises: a first segment coupled to the main body; a second segment coupled to the blade housing; and a guide track disposed in the first segment or the second segment of the extendable member and configured to provide directional guidance to the blade housing and the saw blade between the retracted position and the extended position.

15. The magnetically attachable and extendable saw of any one of paragraphs 1 to 14, wherein the extendable member comprises an actuator or a motor configured to extend or retract the blade housing and the saw blade.

16. The magnetically attachable and extendable saw of any one of paragraphs 1 to 15, wherein the extendable member comprises a sliding dovetail joint adapted to move the blade housing and the saw blade in a linear direction between the retracted position and the extended position, wherein the guide track is a female portion of the sliding dovetail joint disposed in the first segment or the second segment of the extendable member, and a male portion of the sliding dovetail joint is disposed on the first segment or the second segment of the extendable member without the female portion.

17. The magnetically attachable and extendable saw of any one of paragraphs 1 to 16, wherein the extendable member comprises a sliding male/female joint adapted to move the blade housing and the saw blade in a linear direction or a non-linear direction between the retracted position and the extended position, wherein the guide track is a female portion of the sliding male/female joint disposed in the first segment or the second segment of the extendable member, and a male portion of the sliding male/female joint is disposed on the first segment or the second segment of the extendable member without the female portion.

18. The magnetically attachable and extendable saw of paragraph 17, wherein the sliding male/female joint is selected from the group consisting of a dovetail joint, a tongue and groove joint, a pin and slot joint, and derivatives thereof.

19. The magnetically attachable and extendable saw of any one of paragraphs 1 to 18, further comprising a blade guard coupled to the main body and disposed between the saw blade and an upper portion of the blade housing.

20. The magnetically attachable and extendable saw of paragraph 19, wherein the blade guard is configured to at least partially conceal the saw blade within a cutting window of the blade housing when the blade housing and the saw blade are at the retracted position and configured to at least partially reveal the saw blade within the cutting window when the blade housing and the saw blade are at the extended position.

21. The magnetically attachable and extendable saw of any one of paragraphs 1 to 20, wherein the blade housing further comprises an upper portion disposed above the saw blade and a side portion at least partially circumferentially disposed around the saw blade and extending downwardly from the upper portion.

22. The magnetically attachable and extendable saw of any one of paragraphs 1 to 21, wherein the blade housing further comprises a cutting window is disposed or formed within the upper portion and the side portion.

23. The magnetically attachable and extendable saw of any one of paragraphs 1 to 22, wherein the blade housing further comprises a cutting window.

24. The magnetically attachable and extendable saw of any one of paragraphs 1 to 23, further comprising two or more rollers disposed on the blade housing, wherein the rollers extend below the side portion and are configured to roll the blade housing along a work surface as the blade housing moves between the retracted position and the extended position.

25. The magnetically attachable and extendable saw of paragraph 24, wherein the two or more rollers disposed on the blade housing can include three rollers, four rollers, or more rollers.

26. The magnetically attachable and extendable saw of paragraph 25, wherein the rollers are round roller configured to elevate the blade housing off from a work surface.

27. The magnetically attachable and extendable saw of any one of paragraphs 1 to 26, wherein the motorized unit is coupled to or disposed on the blade housing.

28. The magnetically attachable and extendable saw of any one of paragraphs 1 to 27, wherein the blade housing comprises a non-magnetic material.

29. The magnetically attachable and extendable saw of paragraph 28, wherein the non-magnetic material is aluminum or an aluminum alloy.

30. The magnetically attachable and extendable saw of any one of paragraphs 1 to 29, wherein the saw blade is a circular, cold saw blade or a circular, chop saw blade.

31. The magnetically attachable and extendable saw of any one of paragraphs 1 to 30, wherein the motorized unit comprises an electric motor, a hydraulic motor, or a pneumatic motor.

32. The magnetically attachable and extendable saw of paragraph 31, wherein the motorized unit is an electric motor (e.g., DC brush type motor) and the saw blade is rotatable by the electric motor.

33. The magnetically attachable and extendable saw of any one of paragraphs 1 to 32, further comprising a power pack, a battery, or a power cell electrically coupled to the motorized unit.

34. The magnetically attachable and extendable saw of any one of paragraphs 1 to 33, wherein the motorized unit is coupled to the saw blade by at least one or more components selected from the group consisting of shaft, gears, belt, base plate, and combinations thereof.

35. The magnetically attachable and extendable saw of any one of paragraphs 1 to 34, wherein the motorized unit is coupled to a gear reducer, the gear reducer is coupled to a base plate, and the saw blade is coupled to the base plate.

36. The magnetically attachable and extendable saw of any one of paragraphs 1 to 35, wherein a motor/blade rotational speed ratio within a range from about 25:1 to about 400:1, more narrowly within a range from about 50:1 to about 200:1, and more narrowly within a range from about 75:1 to about 150:1, such as, for example, about 100:1.

37. The magnetically attachable and extendable saw of any one of paragraphs 1 to 36, further comprising a blade height adjuster coupled to the blade housing and the base plate, wherein the blade height adjuster is configured to adjust (e.g., increase or decrease) a vertical blade height of the saw blade.

38. The magnetically attachable and extendable saw of paragraph 37, wherein the blade height adjuster comprises a screw mechanism for adjusting the vertical blade height.

39. The magnetically attachable and extendable saw of any one of paragraphs 1 to 38, further comprising a base plate coupled to the motorized unit and the saw blade, wherein the motorized unit is configured to rotate or provide other blade movement to the base plate and the saw blade.

40. The magnetically attachable and extendable saw of paragraph 39, wherein the saw blade is coupled to the base plate by one or more fasteners, one or more keepers, or a combination of one or more fasteners and one or more keepers that are flush with or recessed from a lower side surface of the saw blade, wherein the fasteners include bolts and screws and the keepers include spline sets.

41. The magnetically attachable and extendable saw of paragraph 39, wherein the base plate comprises a male portion of a spline set and the saw blade comprises a female portion of the spline set.

42. The magnetically attachable and extendable saw of any one of paragraphs 1 to 41, wherein the saw blade is configured to have a rotational speed within a range from about 100 rpm to about 500 rpm, more narrowly within a range from about 150 rpm to about 400 rpm, and more narrowly within a range from about 200 rpm to about 300 rpm.

43. A magnetically attachable and extendable saw, comprising: a main body; a blade housing coupled to the main body by at least one extendable member, wherein the blade housing at least partially covers a saw blade and the extendable member is configured to move the blade housing and the saw blade between a retracted position and an extended position relative to the main body; a motorized unit coupled to the saw blade and configured to rotate or provide other blade movement to the saw blade; an electromagnet disposed on the main body, wherein the electromagnet comprises at least one contact surface that is adjustable or switchable between a magnetized state and a non-magnetized state and a switch in electrical communication with the electromagnet and configured to control the magnetized state and the non-magnetized state of the contact surface; and a control system operatively coupled to at least the extendable member, the motorized unit, and the electromagnet, wherein the control system is configured to activate the magnetized state of the contact surface prior to activating the rotation or other blade movement of the saw blade via the motorized unit or extending the extendable member.

44. A method for removing an object protruding from a work surface with an extendable saw, comprising: positioning the extendable saw on or adjacent to the work surface, the extendable saw comprising: a main body; a blade housing coupled to the main body by at least one extendable member, wherein the blade housing at least partially covers a saw blade and the extendable member is configured to move the blade housing and the saw blade between a retracted position and an extended position relative to the main body; a motorized unit coupled to the saw blade and configured to rotate or provide other blade movement to the saw blade; and a switchable magnet disposed on the main body and comprising at least one contact surface that is switchable between a magnetized state and a non-magnetized state; attaching the extendable saw to the work surface by activating the switchable magnet to provide the magnetized state of the contact surface; rotating the saw blade via the motorized unit; extending the blade housing and the saw blade from the retracted position towards the object protruding from the work surface, wherein the object is disposed between the retracted position and the extended position; and cutting through the object with the saw blade to separate the object from the work surface.

45. The method of paragraph 44, further comprising maintaining a blade guard in a stationary position as the blade housing and the saw blade extend from the retracted position, wherein the saw blade is revealed within a cutting window in the blade housing as the saw blade moves away from the blade guard.

46. The method of paragraph 44, further comprising retracting the blade housing and the saw blade to the retracted position subsequent to cutting through the object.

47. The method of paragraph 46, further comprising maintaining a blade guard in a stationary position as the blade housing and the saw blade move towards the retracted position, wherein the saw blade is concealed by the blade guard within a cutting window in the blade housing as the saw blade moves towards the blade guard.

48. A magnetically attachable and extendable saw, comprising: a main body; a blade housing coupled to the main body by at least one extendable member, wherein the blade housing at least partially covers a saw blade and the extendable member is configured to move the blade housing and the saw blade between a retracted position and an extended position relative to the main body; a motorized unit coupled to the saw blade and configured to rotate or provide other blade movement to the saw blade; and a switchable magnet disposed on the main body and comprising at least one contact surface that is switchable between a magnetized state and a non-magnetized state, wherein the switchable magnet comprises one, two, or more pole conduits, core elements, combination carrier platter/core element assemblies disposed within a magnet housing and forming the contact surface.

49. A vacuum-attachable and extendable saw, comprising: a main body; a blade housing coupled to the main body by at least one extendable member, wherein the blade housing at least partially covers a saw blade and the extendable member is configured to move the blade housing and the saw blade between a retracted position and an extended position relative to the main body; a motorized unit coupled to the saw blade and configured to rotate or provide other blade movement to the saw blade; and a vacuum-attachable unit disposed on the main body and comprising at least one contact surface that is switchable between a vacuum state and a non-vacuum state.

50. An attachable and extendable saw, comprising: a main body; a blade housing coupled to the main body by at least one extendable member, wherein the blade housing at least partially covers a saw blade and the extendable member is configured to move the blade housing and the saw blade between a retracted position and an extended position relative to the main body; a motorized unit coupled to the saw blade and configured to provide blade movement to the saw blade; and a switchable device or unit disposed on the main body and comprising at least one contact surface that is switchable between a magnetized or vacuum state and a non-magnetized or non-vacuum state, respectively.

51. A magnetically attachable and extendable saw, comprising: a main body; a blade housing coupled to the main body by an extendable member, wherein the blade housing at least partially covers a saw blade and the extendable member is configured to move the blade housing and the saw blade between a retracted position and an extended position relative to the main body; a motorized unit coupled to the saw blade and configured to drive the saw blade; a switchable magnet disposed on the main body and comprising at least one contact surface that is switchable between a magnetized state and a non-magnetized state; and a control system operatively coupled to the extendable member, the motorized unit, and the switchable magnet.

52. The magnetically attachable and extendable saw of paragraph 51, wherein the at least one extendable member is configured to move the blade housing and the saw blade in a linear direction or a non-linear direction between the retracted position and the extended position.

53. The magnetically attachable and extendable saw of paragraph 51 or 52, wherein the extendable member comprises an actuator unit coupled to and configured to be driven by a motor.

54. The magnetically attachable and extendable saw of paragraph 53, wherein the extendable member further comprises: a first segment coupled to the main body; a second segment coupled to the blade housing; and a guide track at least partially disposed in the first segment or the second segment of the extendable member and configured to provide directional guidance to the blade housing and the saw blade between the retracted position and the extended position.

55. The magnetically attachable and extendable saw of paragraph 54, wherein the extendable member comprises a sliding dovetail joint configured to move the blade housing and the saw blade in a linear direction between the retracted position and the extended position, wherein the guide track is a female portion of the sliding dovetail joint disposed in the first segment or the second segment of the extendable member, and a male portion of the sliding dovetail joint is disposed on the first segment or the second segment of the extendable member without the female portion.

56. The magnetically attachable and extendable saw of any one of paragraphs 51 to 55, wherein the at least one extendable member is configured to move the blade housing and the saw blade between the retracted position and the extended position.

57. The magnetically attachable and extendable saw of paragraph 56, further comprising an actuator unit configured to drive the extendable member between the retracted position and the extended position.

58. The magnetically attachable and extendable saw of paragraph 57, wherein the actuator unit comprises an actuator motor, a rack gear, and a pinion gear.

59. The magnetically attachable and extendable saw of paragraph 58, wherein the pinion gear is coupled to a first segment of the extendable member and the rack gear is coupled to a second segment of the extendable member.

60. The magnetically attachable and extendable saw of any one of paragraphs 51 to 59, wherein the extendable member further comprises a first segment coupled to the main body and a second segment coupled to the blade housing.

61. The magnetically attachable and extendable saw of paragraph 60, wherein a pinion gear is coupled to the first segment of the extendable member, a rack gear is coupled to the second segment of the extendable member, and an actuator motor is operatively coupled to the rack gear and the pinion gear for driving the extendable member.

62. The magnetically attachable and extendable saw of any one of paragraphs 51 to 61, wherein the at least one extendable member comprises a first portion, a second portion, and a sliding dovetail joint disposed between the first and second portions of the extendable member.

63. The magnetically attachable and extendable saw of any one of paragraphs 51 to 62, wherein the saw blade is a circular saw blade and the motorized unit is configured to rotate the circular saw blade.

64. The magnetically attachable and extendable saw of any one of paragraphs 51 to 63, wherein the saw blade has a kerf width of about 0.1 inches to about 0.2 inches and a blade thickness of about 0.09 inches to about 0.11 inches.

65. The magnetically attachable and extendable saw of paragraph 64, wherein the kerf width is about 0.14 inches to about 0.18 inches and the blade thickness of about 0.095 inches to about 0.105 inches.

66. The magnetically attachable and extendable saw of any one of paragraphs 51 to 65, wherein the switchable magnet comprises one or more pole conduits, one or more core elements, or one or more combination carrier platter/core element assemblies.

67. The magnetically attachable and extendable saw of any one of paragraphs 51 to 66, wherein the switchable magnet comprises one or more switchable core element-based permanent magnet apparatuses.

68. The magnetically attachable and extendable saw of paragraph 67, wherein each switchable core element-based permanent magnet apparatus comprises an upper carrier platter aligned above a lower carrier platter by a common axis.

69. The magnetically attachable and extendable saw of paragraph 68, wherein the upper carrier platter, the lower carrier platter, or both are configured to be rotatable about the common axis for activating the magnetized state and the non-magnetized state of the at least one contact surface.

70. The magnetically attachable and extendable saw of paragraph 68, wherein the upper carrier platter comprises two or more upper core elements having magnetically matched pole conduits and the lower carrier platters comprises two or lower more core elements having magnetically matched pole conduits.

71. The magnetically attachable and extendable saw of paragraph 70, wherein the magnetically matched pole conduits of the upper core elements and the magnetically matched pole conduits of the lower core elements are configured to be aligned in phase to activate the magnetized state of the at least one contact surface and configured to be anti-aligned out of phase to activate the non-magnetized state of the at least one contact surface.

72. The magnetically attachable and extendable saw of any one of paragraphs 51 to 71, wherein the control system is configured to maintain the extendable member in the retracted position and maintain the motorized unit from driving the saw blade if the at least one contact surface of the switchable magnet is in the non-magnetized state.

73. A magnetically attachable and extendable saw, comprising: a main body; a blade housing coupled to the main body by an extendable member, wherein the blade housing at least partially covers a circular saw blade and the extendable member is configured to move the blade housing and the circular saw blade between a retracted position and an extended position relative to the main body; a motorized unit coupled to the circular saw blade and configured to drive the circular saw blade; a switchable magnet disposed on the main body and comprising at least one contact surface that is switchable between a magnetized state and a non-magnetized state; and a control system operatively coupled to the extendable member, the motorized unit, and the switchable magnet, wherein the control system is configured to maintain the extendable member in the retracted position and maintain the motorized unit from driving the circular saw blade if the at least one contact surface of the switchable magnet is in the non-magnetized state.

74. A magnetically attachable and extendable saw, comprising: a main body; an extendable member coupled to and between the main body and a blade housing, wherein the extendable member is configured to move the blade housing and a saw blade between a retracted position and an extended position relative to the main body, and wherein the extendable member comprises a first segment coupled to the main body and a second segment coupled to the blade housing; an actuator unit configured to drive the extendable member for moving the blade housing and the saw blade between the retracted position and the extended position, wherein the actuator unit further comprises: a pinion gear coupled to the first segment of the extendable member; a rack gear coupled to the second segment of the extendable member, and an actuator motor operatively coupled to the rack gear and the pinion gear and configured to drive the extendable member; a motorized unit coupled to the saw blade and configured to drive the saw blade; and a switchable magnet disposed on the main body and comprising at least one contact surface that is switchable between a magnetized state and a non-magnetized state.

FIGS. 8A-8D depict perspective views of an illustrative magnetically attachable and extendable saw 100, according to one or more alternative embodiments. FIG. 8E depicts a perspective view of a portion of the illustrative magnetically attachable and extendable saw, according to one or more alternative embodiments described.

The extendable saw 100 can include a main body 102 and a blade housing 110 which can be coupled together by at least one extendable member 120. The blade housing 110 can at least partially cover a saw blade 130 and the extendable member 120 can be configured to move the blade housing 110 and the saw blade 130 to, from, and/or between a retracted position and an extended position relative to the main body 102. A motorized unit 140 can be coupled to the saw blade 130 and configured to rotate, drive, or otherwise provide blade movement to the saw blade 130.

Similar to the embodiments previously depicted, the main body 102 can include left wing 507 and right wing 509, each containing switchable magnets 150 similar to those depicted in FIGS. 1A-1C and 2A-2B, contained within magnet housings 154, and each having at least one contact surfaces 552 that can be adjustable or switchable between a magnetized state and a non-magnetized state. In some embodiments, the switchable magnet 150 can be an electromagnet configured to provide the magnetized state and the non-magnetized state from a power source (not shown). For example, the switchable magnet 150 can be an electromagnet in electrical communication with the power source via an electrical control switch, such as switch 156. The switch 156 can be configured to control the magnetized state and the non-magnetized state of the contact surfaces 552 by providing an electrical contact in the circuit or by breaking the electrical contact in the circuit. In other embodiments, the switchable magnet 150 can include one or more permanent magnets configured to provide the magnetized state and the non-magnetized state of the contact surfaces 552. Depending on the type of magnets utilized in the switchable magnet 150, a magnet housing 154 similar to that depicted in FIGS. 1A-1C and 2A-2B can include various magnets (e.g., electromagnet and/or permanent magnets) and/or be a structural portion of the switchable magnet 150. For example, the switchable magnet 150 can include one or more electromagnets at least partially within the magnet housing 154 and the contact surfaces 552 of the electromagnet can be a lower surface of the magnet housing 154. In another example, the magnet housing 154 can be the outer surface of or other portion of one or more electromagnets that can form the switchable magnet 150 and the outer surface of the magnet housing 154 can be the contact surfaces 552.

Similar to the embodiments previously depicted, the control system 158 can include one or more microprocessors, one or more controllers, one or more switches, software, and/or other equipment that can control one or more of the various aspects and systems of the extendable saw 100, including, but not limited to, the activation and subsequent control of the magnetized state and the non-magnetized state of the contact surfaces 552, the powering and the rotational speed or other blade movement speed of the saw blade 130, and/or the movement of the blade housing 110 and the saw blade 130. In one example, a single engagement of the switch 156 can activate the control system 158 to activate and maintain the magnetized state of the contact surface 152, power-up and rotate the saw blade 130, and extend the blade housing 110 and the saw blade 130 to the desired object to be cut. In another example, a single engagement of the switch 156 can activate the control system 158 to retract the blade housing 110 and the saw blade 130 to the retracted position, power-down the saw blade 130, and finally deactivate the magnetized state (or active the non-magnetized state) of the contact surfaces 552.

Similar to the embodiments previously depicted, the blade housing 110 can include one or more upper faces or upper portions 112 and one or more side walls or side portions 114. The upper portion can be disposed about or above the saw blade 130 and the side portion 114 can be at least partially circumferentially disposed around the saw blade 130 and can be extending downwardly from the upper portion 112. An opening or a cutting window 118 can be disposed within or otherwise defined by the upper portion 112 and the side portion 114 of the blade housing 110. The cutting window 118 can provide the saw blade 130 exposure or access to objects that are to be cut by the extendable saw 100 during the cutting operations. The blade housing 110 can be made from or contain one or more non-magnetic materials, such as, for example, aluminum, an aluminum alloy, magnesium, non-magnetic stainless steel, or alloys thereof.

Similar to the embodiments previously depicted, the extendable saw 100 can include a blade guard 180, which may be spring-loaded, coupled to the main body 102 and disposed between the saw blade 130 and the upper portion 112 of the blade housing 110.

Similar to the embodiments previously depicted, the main body 102 including switchable magnets having contact surfaces 552 that can be adjustable or switchable between a magnetized state ("on") and a non-magnetized state ("off"). The switchable magnets can also include a magnet housing 154, one or more permanent magnets disposed within the magnet housing, and switches, handles, knobs, or levers 257 extending from the magnet housing. The permanent magnets can be configured to provide the magnetized state and the non-magnetized state of the contact surfaces 552. The switches, handles, knobs, or levers can be configured to cause relative rotation of the permanent magnets for controlling the magnetized state and the non-magnetized state of the contact surfaces. For example, they can be pulled, pushed, switched, turned, rotated, twisted, and/or slid, in one or more directions to cause relative rotation of the permanent magnets for controlling the magnetized state and the non-magnetized state of the contact surfaces 552.

Similar to the embodiments previously depicted, the blade housing 110 can include at least one roller 108.

Similar to the embodiments previously depicted, the magnets can be a switchable magnet or multiple switchable magnets of two or more magnets in a row (FIG. 4B). In one embodiment the magnets may be separated, having two, three, or more magnets arranged in wings 507 and 509 to offset the torque of the saw blade 130 as it engages. Wings 507 and 509 containing one or more magnets may be supplemented by two or more magnets in a row as depicted in FIG. 4B.

For ease of operation the saw blade height adjustment 568 mechanism may be used to adjust the height of the saw blade relative to the object to be cut. It may be a knob as depicted or something similar to effect the same purpose. In the embodiment depicted, the saw blade height is adjusted by rotating the knob clockwise or counter-clockwise. The adjustment may apply to the base plate 170 and blade 130. To help insure the saw blade height remains constant, a locking mechanism 569 may be used to hinder or stop saw blade height movement due to vibration, slippage, gravitational pull, or other reasons.

To assist in effecting the methods set forth herein, one or more handles 504 and 505 may be employed. The handles facilitate carrying, positioning, and effecting use of the invention set forth herein. The handles can also be used to invert the saw upside down for servicing such as blade changing or cleaning.

One or more eyelets 506 may be provided in order to provide a tie point tethered from the saw to a fixed point in order, for example, to secure it from falling from heights during, before, or after use.

Figure 9:
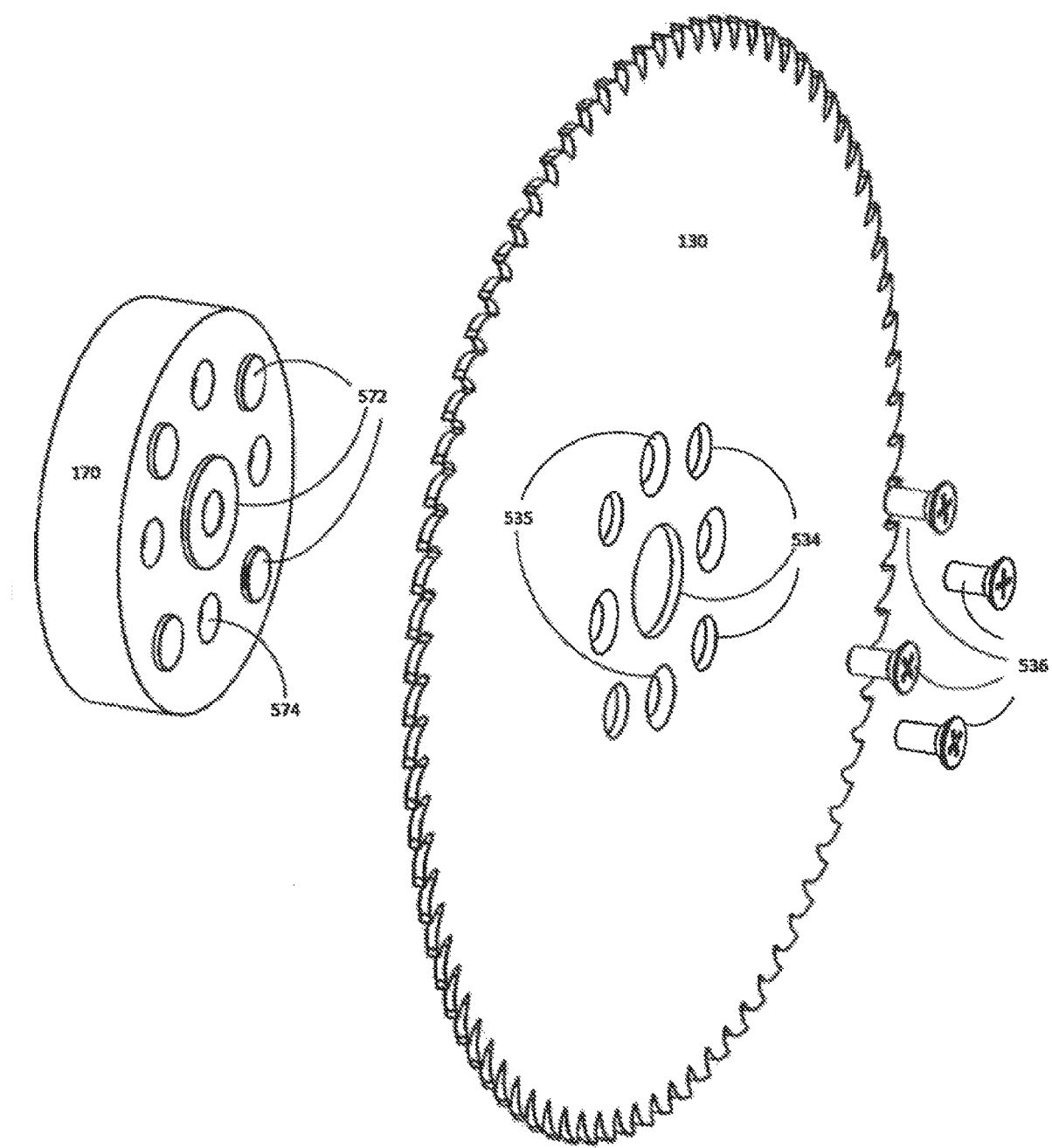
FIG. 9 depicts an illustrative embodiment of saw blade attachment.

In one embodiment (FIG. 9) the saw blade 130 can be secured and stabilized by any number of round, square, rectangle, triangle, or irregular pins 572 to carry the torque offset of the blade while engaged. The pins 572 will be straight wall type over which the saw blade 130 may slide. Pins 572 can number two or more. The pins will not extend past the downward surface of the blade in order to ensure that the saw blade when employed sits flat against the surface holding an object to be cut. Pins 572 on base plate 170 mate with holes 534 on saw blade 130. Counter sunk holes 535 to the saw blade 130 receive flush mount fasteners 536 to keep the saw blade 130 in position on the base plate 170. Holes 574 in base plate 170 in turn receive flush mount fasteners 536. Counter sunk holes 535, can number two, three, four, five, six, or more.

Figure 8A:
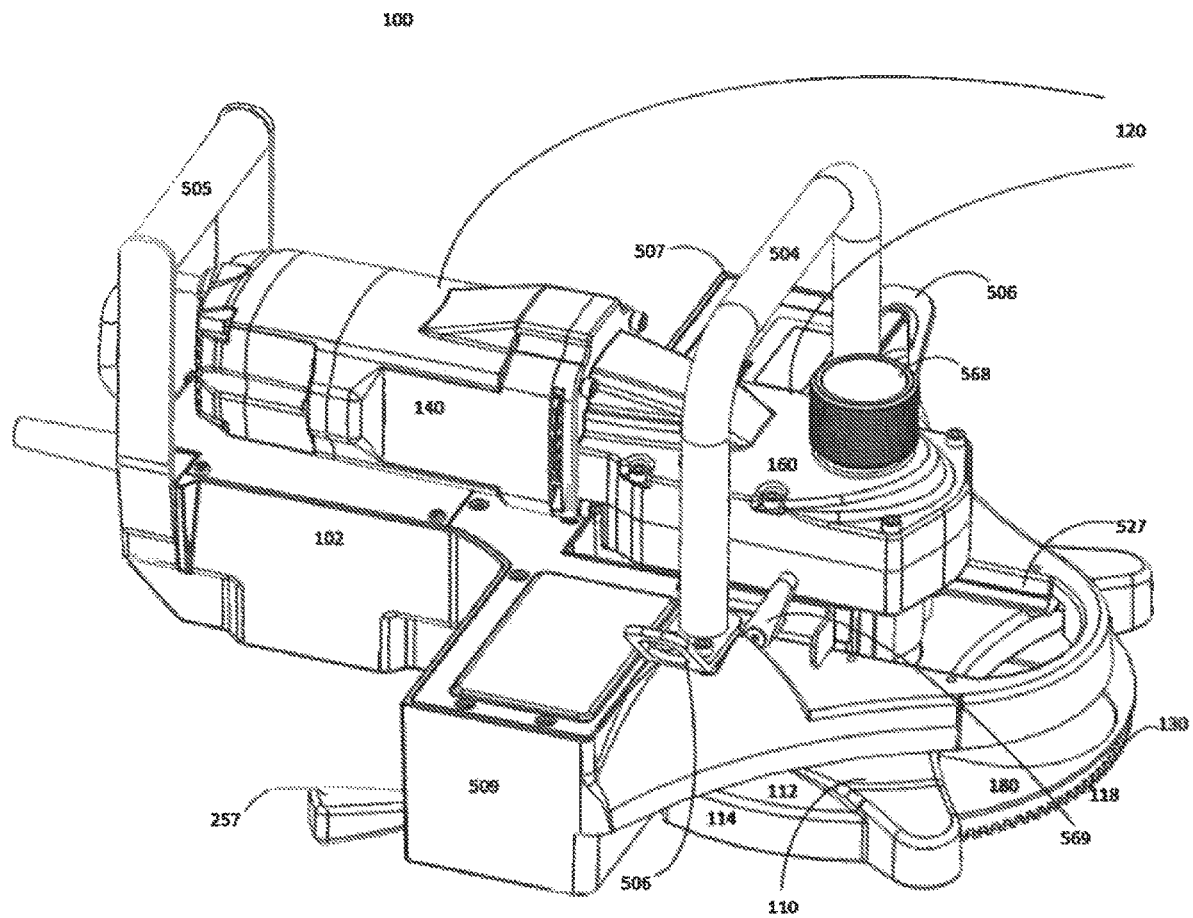
FIGS. 8A-8D depict perspective views of an illustrative magnetically attachable and extendable saw, according to one or more alternative embodiments described.
Figure 8B:
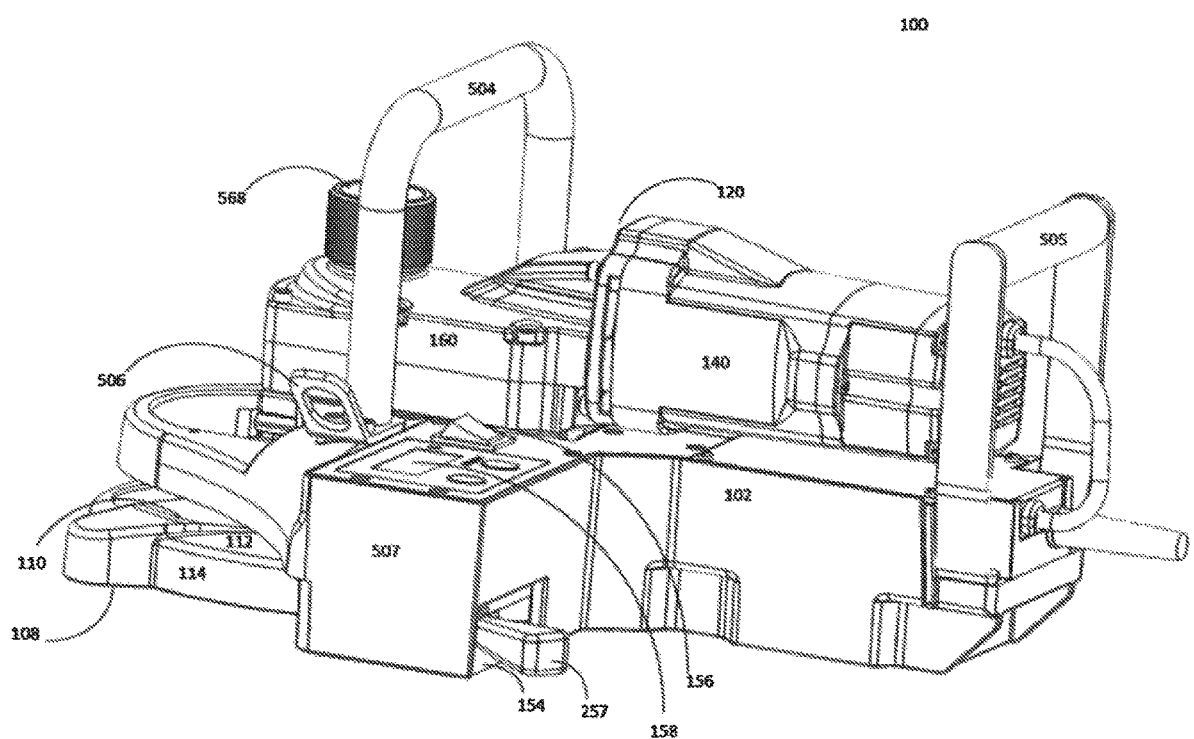
Figure 8C:
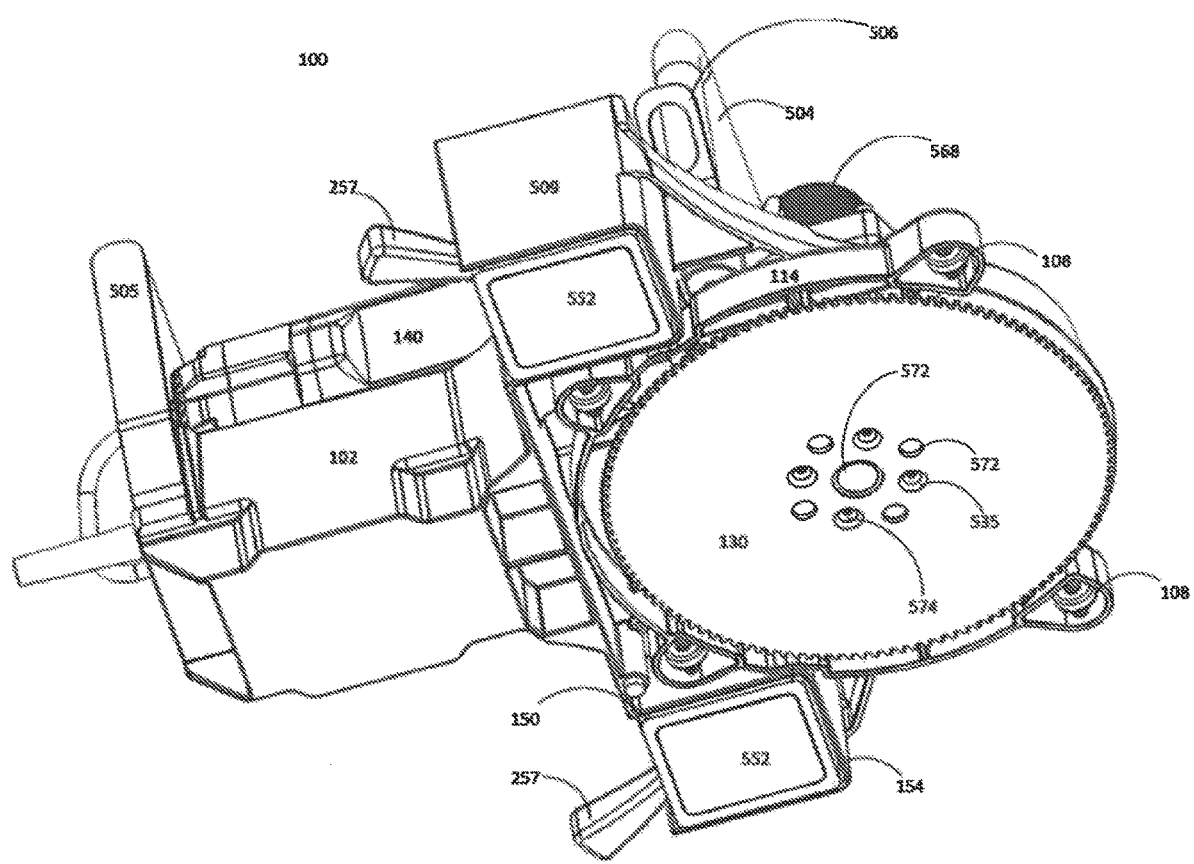
Figure 8D:
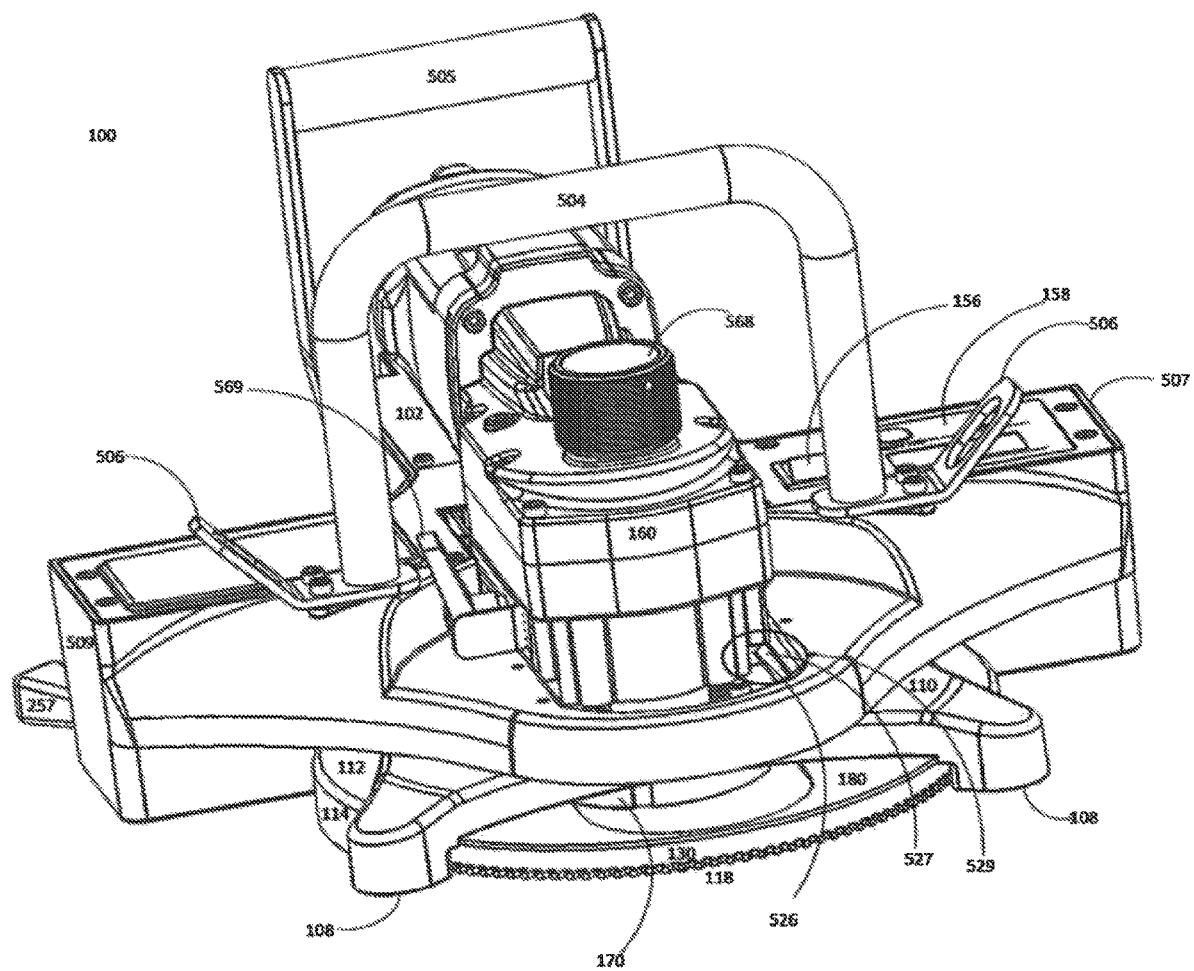
Figure 8E:
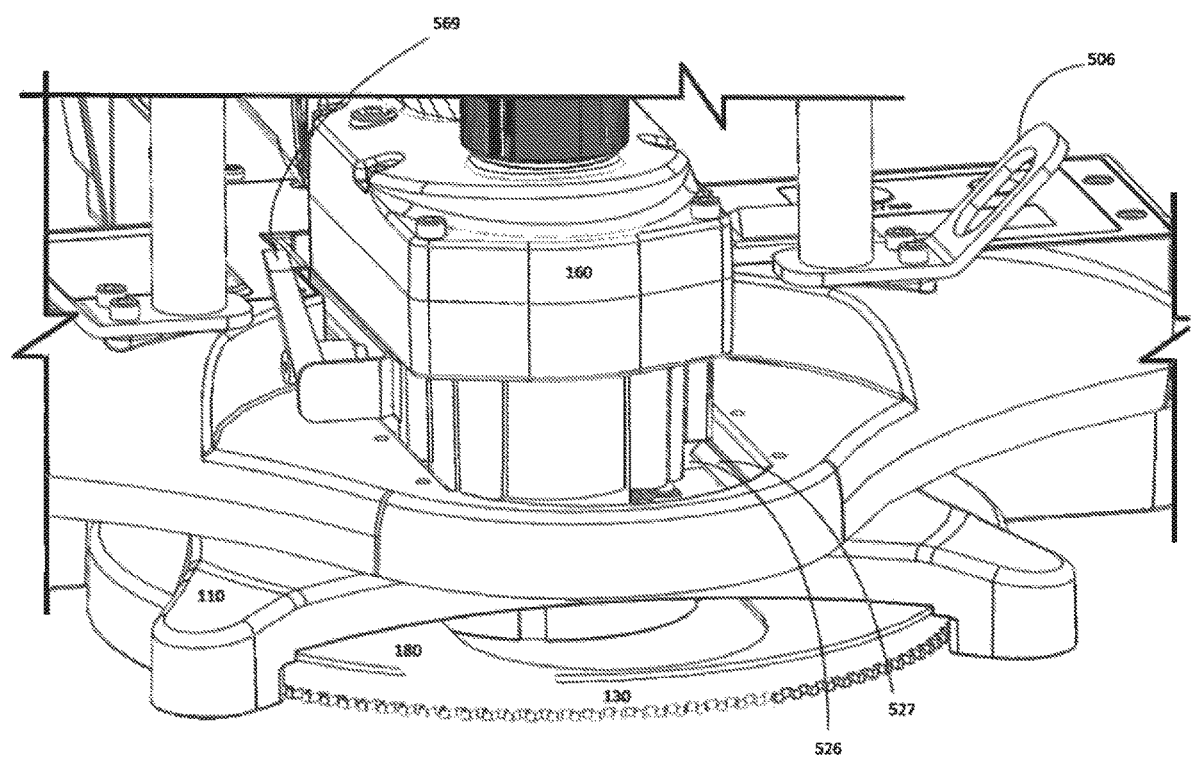
FIG. 8E depicts a perspective view of a portion of the illustrative magnetically attachable and extendable saw, according to one or more alternative embodiments described.

In some embodiments, the sliding male/female joint 330 of FIGS. 5F and 5G can also be formed as 529 in FIG. 8D. FIG. 8D shows the male portion 527, the female portion 526, and the combination of the male/female joint 529. In FIG. 8E an enlarged area shows the male portion 527, the female portion 526, which combined make the sliding male/female joint 529. This arrangement will move the blade drive system 120 in a linear direction to and from, and/or between the retracted and extended positions of the saw actuation from the fixed main body 102. This movement accomplishes the cut process.

The blade housing 110 consists of a top 112, side 114, roller 108, and spring-loaded blade guard 180 over the cut open area 118. As the linear movement of the cutting assembly 120, made up of the motor 140, gearbox 160, blade 130, and guard 110, pushes the blade 130 into the object being cut, the spring-loaded blade guard 180 is pushed back by the object being cut. The blade guard 180 covers the saw blade while the blade is not engaged.

FIGS. 7A-7B show that the saw can be held in place with vacuum rather than magnets when attached to a nonmagnetic surface. The vacuum may be applied through several means, including without limitation the use of one or more suction cups applied to the main body 102. Materials containing an object to be cut may include aluminum, stainless steels in the 300 series, fiberglass, etc. surfaces as an example. Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. An attachable and extendable saw comprising:
    a main body;
    a circular saw blade;
    a saw blade housing coupled to the main body by an extendable member, wherein the saw blade housing is integral with the main body, and wherein the saw blade housing sits flat against a work surface and in a parallel plane to the work surface which holds an object to be cut by a saw blade and at least partially covers the circular saw blade, and the extendable member is configured to move the circular saw blade in a linear direction between a retracted position and an extended position relative to the main body;
    a motorized unit coupled to the circular saw blade and configured to drive the saw blade by saw blade driving means;
    actuator means coupled to the extendable member and configured to drive the extendable member by extendable member driving means;
    attaching means disposed on the main body for attaching the attachable and extendable saw to the work surface;
    a control system operatively coupled to one or more of the extendable member, the motorized unit, the actuator means, and the attaching means,
    wherein the circular saw blade fits flat against said work surface holding the object to be cut; and
    a roller capable of wheeling the main body into position.

2. The attachable and extendable saw of claim 1 wherein the attaching means comprises vacuum means.

3. The attachable and extendable saw of claim 1 wherein attachment of the saw blade comprises:
    one or more pins jutting out from a base plate, which pins mate with one or more holes in the saw blade but do not extend past the lower surface of the saw blade; and
    flush mount fasteners that penetrate one or more other holes in the saw blade and mate with one or more holes in the base plate.

4. The attachable and extendable saw of claim 1 wherein the saw blade height relative to the work surface holding the object to be cut is adjustable by saw blade height adjustment means.

5. The attachable and extendable saw of claim 4 wherein the saw blade height adjustment means may be locked and unlocked.

6. The attachable and extendable saw of claim 1 wherein one or more handles are employed to facilitate carrying, positioning, and effecting use of said attachable and extendable saw.

7. The attachable and extendable saw of claim 1 wherein one or more eyelets are employed to provide a tie point to tether the saw to another point.

8. The attachable and extendable saw of claim 1 wherein the attaching means comprises magnets.

9. A vacuum-attachable and extendable saw, comprising:
    a main body;
    a circular saw blade;
    a saw blade housing coupled to the main body by an extendable member, wherein the saw blade housing is internal with the main body, and wherein the saw blade housing sits flat against a work surface and in a parallel plane to the work surface which holds an object to be cut by a saw blade and at least partially covers the circular saw blade, and the extendable member is configured to move the circular saw blade in a linear direction between a retracted position and an extended position relative to the main body;

a motorized unit coupled to the saw blade and configured to drive the saw blade by saw blade driving means;

actuator means coupled to the extendable member and configured to drive the extendable member by extendable member driving means;

a vacuum-attachable unit disposed on the main body and comprising at least one contact surface that is switchable between a vacuum state and a non-vacuum state;

the vacuum-attachable unit further comprising one or more vacuum ports;

a control system operatively coupled to one or more of the extendable member, the motorized unit, the actuator means, and the attaching means;

a roller capable of wheeling the main body into position;

wherein the circular saw blade fits flat against said work surface holding the object to be cut, which object protrudes from the work surface.

10. A method for cutting an object protruding from a work surface with an attachable and extendable saw, comprising the steps of:

positioning the extendable saw on or adjacent to the work surface, the extendable saw comprising;

a main body;

a circular saw blade:

a saw blade housing coupled to the main body by an extendable member, wherein the saw blade housing is integral with the main body, and wherein the saw blade housing sits flat against a work surface and in a parallel plane to the work surface which holds an object to be cut by a saw blade and at least partially covers the circular saw blade, and the extendable member is configured to move the circular saw blade in a linear direction between a retracted position and an extended position relative to the main body;

a motorized unit coupled to the circular saw blade and configured to drive the saw blade by saw blade driving means;

actuator means coupled to the extendable member and configured to drive the extendable member by extendable member driving means;

attaching means disposed on the main body for attaching the attachable and extendable saw to the work surface;

a control system operatively coupled to one or more of the extendable member, the motorized unit, the actuator means, and the attaching means, wherein the circular saw blade fits flat against said work surface holding the object to be cut, which object protrudes from the work surface; and a roller capable of wheeling the main body into position;

attaching the extendable saw to the work surface by activating the attaching means;

driving the saw blade via the motorized unit;

extending the saw blade from the retracted position towards the object protruding from the work surface, wherein the object is disposed between the retracted position and the extended position; and cutting the object with the saw blade.

* * * * *